United States Patent
Stridsberg

(10) Patent No.: US 6,740,002 B1
(45) Date of Patent: May 25, 2004

(54) HYBRID POWERTRAIN

(75) Inventor: Lennart Stridsberg, Enskede (SE)

(73) Assignee: Stridsberg Innovation AB, Enskede (SE)

( * ) Notice: Subject to any disclaimer, the term of this patent is extended or adjusted under 35 U.S.C. 154(b) by 0 days.

(21) Appl. No.: 09/557,902

(22) Filed: Apr. 21, 2000

Related U.S. Application Data

(63) Continuation of application No. PCT/SE98/01913, filed on Oct. 21, 1998.

(30) Foreign Application Priority Data

| Oct. 21, 1997 | (SE) | 9703887 |
| Jan. 8, 1998 | (SE) | 9800043 |
| Jan. 25, 1998 | (SE) | 9800228 |
| Jan. 30, 1998 | (SE) | 9800288 |
| Mar. 3, 1998 | (SE) | 9800690 |
| Mar. 22, 1998 | (SE) | 9800987 |
| May 20, 1998 | (SE) | 9801848 |
| Jul. 2, 1998 | (SE) | 9802413 |
| Aug. 27, 1998 | (SE) | 9802913 |
| Sep. 29, 1998 | (SE) | 9803313 |

(51) Int. Cl.[7] .................................................. F16H 3/72
(52) U.S. Cl. ..................... 477/14; 477/3; 477/5; 475/5
(58) Field of Search .................... 477/2, 3, 7, 12, 477/14, 5; 475/1, 2, 3, 4, 5; 180/65.2, 65.4, 65.7

(56) References Cited

U.S. PATENT DOCUMENTS 4,533,011 A   8/1985  Heidemeyer et al.
4,578,955 A * 4/1986  Medina .................. 180/65.4 X
4,748,337 A * 5/1988  Raad et al. .................... 290/31
5,337,848 A   8/1994  Bader (List continued on next page.)

FOREIGN PATENT DOCUMENTS

| EP | B1510582 | 12/1996 |
| EP | A2755818 | 1/1997 |
| EP | A2769403 | 4/1997 |

Primary Examiner—Ha Ho
(74) Attorney, Agent, or Firm—Birch, Stewart, Kolasch & Birch, LLP

(57) ABSTRACT

A method and an apparatus control a car equipped with an automatic transmission having a lockup clutch. When the lockup clutch is in the lockup state, a variation of a generated torque is detected. When the range of the torque variation detected exceeds a predetermined value, an engine torque is reduced by controlling the engine, and the automatic transmission is controlled to compensate for a reduction of the driving torque due to a reduction of the engine torque. Thus, the speed change ratio is changed to the low gear side. The control unit includes a unit for controlling an output torque of an engine according to a command value, a unit for changing the transmission ratio of the automatic transmission, a unit for detecting a variation of the engine torque, a unit for deciding a target driving torque, a unit for reducing a torque command value when the range of a detected variation of the torque has exceeded a predetermined value when the lockup clutch was in the lockup state, and a unit for deciding a transmission ratio at which the reduction of the driving torque due to the reduction of the engine torque is compensated for.

114 Claims, 7 Drawing Sheets

U.S. PATENT DOCUMENTS

| | | | |
|---|---|---|---|
| 5,492,189 A | | 2/1996 | Kriegler et al. |
| 5,513,719 A | * | 5/1996 | Moroto et al. .............. 180/65.4 |
| 5,549,524 A | * | 8/1996 | Yang .............................. 477/3 |
| 5,561,359 A | | 10/1996 | Matsura et al. |
| 5,586,613 A | | 12/1996 | Ehsani |
| 5,720,690 A | * | 2/1998 | Hara et al. .................. 477/3 X |
| 5,722,502 A | | 3/1998 | Kubo |
| 5,722,911 A | * | 3/1998 | Ibaraki et al. .................. 477/3 |
| 5,773,904 A | * | 6/1998 | Schiebold et al. ..... 180/65.2 X |
| 5,842,534 A | * | 12/1998 | Frank ......................... 180/65.2 |
| 5,844,342 A | * | 12/1998 | Miyatani et al. ............. 475/5 X |
| 5,846,155 A | * | 12/1998 | Taniguchi et al. .............. 477/2 |
| 5,846,731 A | * | 12/1998 | Buglione et al. .......... 180/65.2 |
| 5,856,709 A | * | 1/1999 | Ibaraki et al. ............... 475/5 X |
| 5,888,166 A | * | 3/1999 | Minowa et al. ............. 477/168 |
| 5,975,227 A | | 11/1999 | Vlad |
| 6,190,282 B1 | * | 2/2001 | Deguchi et al. ........ 180/65.2 X |

* cited by examiner

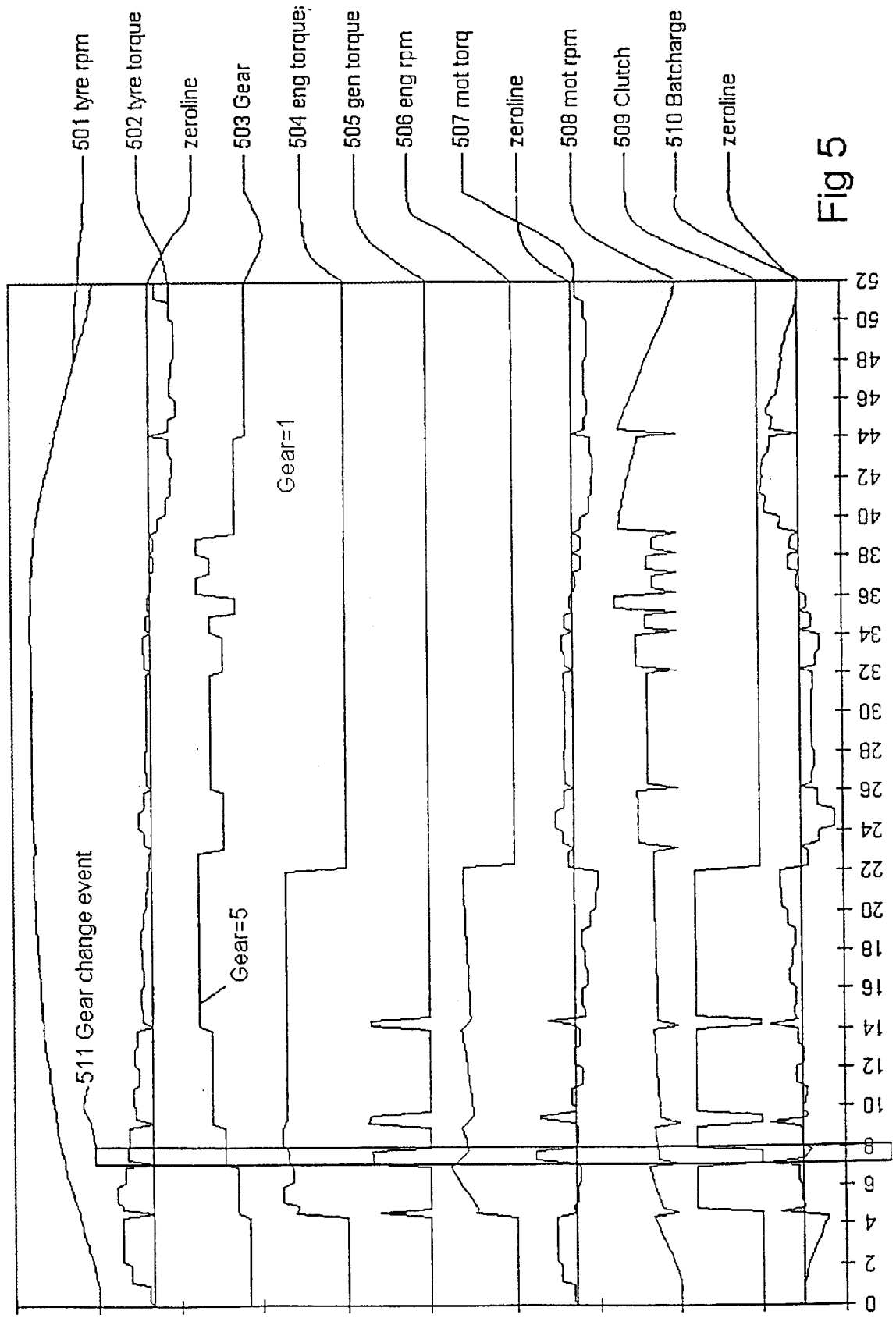

HYBRID POWERTRAIN

This application is a Continuation of PCT International Application No. PCT/SE98/01913 filed on Oct. 21, 1998, which designated the United States and on which priority is claimed under 35 U.S.C. § 120, the entire contents of which are hereby incorporated by reference.

TECHNICAL FIELD

The present invention is concerned with hybrid powertrains for vehicles, i.e. the combined devices needed for propelling vehicles including engines, motors, mechanical transmission means such as shafts, gears, axles, etc., and finally the exterior driving devices such as wheels and tires acting by friction on a surface of the ground such as that of a road.

BACKGROUND

A powertrain or drive train for a vehicle generally comprises some kind of motor or thermal or heat engine producing a mechanical force or torque and some transmission means converting the force or torque to a movement of the vehicle. The transmission means thus normally comprise a gear box or generally some mechanical conversion means, the wheels of the vehicle and various shafts from the motor and between the components of the transmission means. Such powertrains for vehicles can use a one or two electric motors which are capable of driving the vehicle at least at moderate power levels using energy stored in an electric energy storage unit such as an electrochemical accumulator and at the same time such a powertrain can use a thermal engine to charge the electrical storage system and to possibly supply extra power during time periods when high power levels are required. Alternatively the thermal engine can ordinarily drive the vehicle and simultaneously charge the energy storage, from which power is supplied to an electric motor when extra driving power is required. This kind of powertrains using two different motors of quite different types is called hybrid powertrains.

Classical hybrid powertrains comprise two basic types, the serial type, the construction of which is schematically illustrated in FIG. 1, and the parallel type, the construction of which is schematically illustrated in FIG. 2.

In the SEV ("Serial Hybrid Vehicle") system illustrated in FIG. 1, an electric motor 101 directly drives the wheels 108 of a vehicle and thus provides all of the power required by the wheels for propelling the vehicle. The electric motor receives electric power from an accumulator 104. At high power levels, the thermal engine 103 is activated to drive a generator 102 and thus adds through the generator additional power to the accumulator, this additional power being the difference between the power required by the electric motor and the power which can be directly taken from the accumulator. At least for longer trips, the thermal engine 103 and the generator 102 will when required charge the accumulator 104 and thereby supply most of the power required by the electric motor 101 for driving the wheels.

In most applications, a mechanical reduction 105 is used to allow the use of electric motors 101 having a lower torque and a higher speed than what is normally required for driving the wheels 108. The mechanical reduction 105 is thus connected between the electric motor 101 and the wheels 108. However, the electric motor 101 must be dimensioned to provide all the power required by the wheels at all times, and a torque which varies linearly with the torque of the wheels.

Serial hybrid vehicle systems of the kind described above are often designed to use small thermal engines which are dimensioned to be capable of providing little more than the average power required for driving the vehicle on a horizontal highway at high speeds, such as in typical designs about some 10 kW. This permits the thermal engine to work either at an optimum load point or not at all, thereby keeping its average efficiency close to an optimum point. During accelerations and short inclinations a much higher power is taken from the accumulator, which can be an electrochemical battery, a flywheel, a supercapacitor, etc. Long heavy inclinations require a high power over a long time period for driving the vehicle, what in turn either requires a thermal engine having a high output power or an accumulator having a high energy content.

In the PHV ("Parallel Hybrid Vehicle") system as schematically illustrated by the block diagram of FIG. 2 a thermal engine 203 is connected to convey a torque to the differential gearing and wheels 208 through a disengageable clutch 207 and a gearbox 206. The gearbox 206 can also receive input torque from an electric generator/motor 201 through an optional mechanical reduction 205. The electric generator/motor receives its input power from an energy storage unit or accumulator 204. The torques provided by the thermal engine 203 and the electric generator/motor 201 are thus both input to the gearbox, this implying that also torque can be provided from e.g. the thermal engine 203 to the electric generator/motor 201, when there is sufficient power available in the thermal engine. In such cases the accumulator can be charged by the electric generator/motor which then operates as a generator.

Generally, the accumulator 204 and the electric generator/motor 201 and its electronic drive circuits, not shown, have to provide a power being the difference between the power required for driving the wheels and the power which is provided by the thermal engine 203. In many applications, a mechanical reduction 205 is used to allow the use of electric motors having a lower torque and a higher speed than those provided by the thermal engine.

When the thermal engine 203 is switched off it is also disconnected from the wheels by operating the clutch 207. All of the traction power is in this case supplied from the energy storage 204 through the electric motor 201 which can also work as an electric generator. The energy storage 204 can, as has already been mentioned, be charged by the thermal engine 203 while the vehicle is running. The parallel hybrid vehicle system as described above has the disadvantage that the speed of the thermal engine 203 is dependent on the speed of the tires of the wheels and the setting of the gearbox 206 and therefore the thermal engine has a nonconstant speed during running and then also during charging the energy storage or accumulator 204. The torque of the thermal engine 203 can however be maintained at a suitable value by selecting a suitable torque (positive or negative) for the electric generator/motor 201. As the engine will loose its load as soon as the clutch is disengaged, the torque of the thermal engine 203 must change quickly as soon as a gearshift is performed. For many thermal engine designs, this operation in addition causes high peaks of environmentally unwanted emissions.

Parallel hybrid vehicle systems are disclosed in U.S. Pat. Nos. 4,533,011, 5,337,848, 5,492,189 and 5,586,613.

In FIGS. 3a and 3b block diagrams of two hybrid systems are shown which can be described to be mixtures or combinations of the serial hybrid vehicle systems and the parallel hybrid vehicle systems as described above. Employing the terms used in the published European patent application EP 0 744 314 A1 they can be called PSHV ("Parallel Serial Hybrid Vehicle") systems.

The parallel serial hybrid vehicle system illustrated by the block diagram of FIG. 3a is described in the cited EP 0 744 314 A1, see the description of FIG. 9 in this document. The system according to FIG. 3a has the advantage that it to some extent can use both the advantages of a serial hybrid vehicle system and a parallel hybrid vehicle system. Here the thermal engine 303 has an electric generator/motor 309 directly mechanically coupled to its output shaft, not shown. To the output shaft is also an electric motor 301 connected but through a clutch 307. The output shaft thus drives through the clutch 307, when it is engaged, the differential gearing and the wheels 308. The electric generator/motor 309 and the electric motor 301 can when required be powered by the electric energy storage 304 and the electric generator/motor 309 can also charge the energy storage.

When the clutch 307 is disengaged and freely running, the vehicle system of FIG. 3a acts as an SHV system and gives a constant or slowly varying load on the thermal engine 303, permitting a high thermal engine efficiency and low emissions. When the clutch 307 is engaged it gives the advantage of a PHV system, i.e. a higher power transfer efficiency between the thermal engine 303 and the wheels 308. As pointed out in EP 0 744 314 A1, see column 4, lines 6 ff., the last advantage is only applicable for medium to high speed vehicle movements since the rotation speed of the thermal engine and thus of the electric generator/motor 309 at low vehicle speeds will be below the lower operational limit of the rotational speed of the thermal engine.

In FIG. 3b a block diagram of a PSHV system is shown in which the speed of the thermal engine 303 is independent of that of the differential and wheels 308. The system of FIG. 3b is obtained from that depicted in FIG. 3b by replacing the electric generator/motor 309 with a planetary gear 310, the planetary gear instead driving or being driven by the electric generator/motor 309. The thermal engine 303 thus drives the differential gearing and the wheels 308 through this planetary gear 310 and the clutch 307, when the clutch is engaged.

In the state in which the thermal engine 303 drives the wheels, the system can for analytic purposes be regarded as three blocks, the first block of which is the thermal engine 303. The second block 311 consists of the planetary gearbox 310, the electric generator/motor 309 and a first aspect of the electric motor 301. The second block operates as a continuously variable transmission between the thermal engine 303 and the differential and wheels 308. It transfers the power from the thermal engine 303 from one speed/torque combination suitable for efficient and environmentally good operation of the thermal engine 303 to another speed/torque combination suitable for the differential gearing/wheels 308. The output torque of the second block will be determined by the input torque and the speed relation of the input and output shafts of the second block. The mechanical energy at the input shaft of the second block minus conversion losses will appear at the output shaft thereof as it would in a purely mechanical, continuously variable transmission.

The third block consists of a different, second aspect of the electric motor 301, which adjusts the output torque from the variable transmission block 311 to the torque required by the wheels. It does this by converting power from the accumulator 304 to a mechanical torque and adding this extra mechanical power to the shaft of the motor 301 or by converting excess mechanical power at the shaft to electric power and charging the accumulator 304. The physical electric motor 301 is required to provide a torque which is the sum of the two torques attributed thereto as a component of both the second block and the third block in the analysis given above.

The hybrid powertrain according to FIG. 3b has the advantage of allowing that part of the power of the thermal engine 303 can be transferred by a highly efficient mechanical path from a the thermal engine 303 to the differential and wheels 308 and still permitting the thermal engine 303 to run at a slowly varying speed. The thermal engine speed and torque can therefore be selected to optimize thermal engine efficiency and polluting properties independently of the speed and torque of the differential gearing and wheels 308.

SUMMARY

It is an object of the invention to provide a PSHV system having a high overall efficiency path from a thermal engine of the system to the wheels of a vehicle.

Another object of the invention is to provide a PSHV system which permits a thermal engine of the system to operate at a high overall efficiency.

Another object of the invention is to provide a PSHV system which avoids variations of speed and torque of the thermal engine faster than what is compatible with goals for emissions and efficiency.

Another object of the invention is to provide a PSHV system which gives an acceptable performance if the accumulator and/or electric motor system capacity should be reduced or even if the accumulator and/or electric motor system cease to operate.

Another object of the invention is to provide a PSHV system, which is capable of recharging its accumulator even when the vehicle is stationary.

Another object of the invention is to provide a PSHV system having a long service life and a low cost, in particular a PSHV system having a dramatically reduced slip and other moving friction forces on components like clutch and gearbox components during shifts of gear position or speed.

Another object of the invention is to provide a PSHV system capable of driving a vehicle when ascending long steep slopes.

Another object of the invention is to provide a PSHV system capable of braking a vehicle when descending long steep slopes.

Another object of the invention is to provide a PSHV system which is capable of providing occasional high output power peaks using electric motors and thermal engines having comparatively modest power ratings.

Another object of the invention is to provide a PSHV system which makes use of investments already made in designs and automated equipment for manufacturing vehicles.

Another object of the invention is to provide a PSHV system which permits the use of electric motors of the permanent magnet type having considerable losses when spinning or rotating at low loads without obtaining high losses during high vehicle speeds.

The problem solved by the invention is how a hybrid powertrain of the combined serial and parallel type can be constructed which as improved performance, in particular a reduced fuel consumption and a high total efficiency. Thus a powertrain for a vehicle is the combined serial and parallel hybrid type as generally defined above. It comprises a thermal engine, an electric generator/motor mechanically coupled to the output shaft of the engine, a coupling device such as a clutch which can connect the output shaft to the wheels for driving the vehicle. Thus, the output shaft can be divided in two portions, the coupling device connecting the two portions rigidly to each other when required. An electric motor/generator is mechanically connected to the wheels for driving them when required. It can be connected to the distant portion of the output shaft, which can be disconnected from the near portion by operating the coupling device. The clutch can connect the output shaft of the engine to the input shaft of a gearbox, the output shaft of which is connected to the wheels of the vehicle through a differential. An electric motor is mechanically connected to the differential or the gearbox input- or output shafts. Both the generator/motor and the electric motor can be driven by the thermal engine to charge an electric accumulator and can receive electric power therefrom to provide extra torque. The term "mechanically connected" means that the electric motors have the motion of their rotation shaft coupled to the respective shaft, such as having a common shaft, interacting through a gearing, a belt, etc.

Generally, a powertrain of a vehicle comprises a mechanical gear box and at least one thermal engine, ordinarily only one, having an output shaft, which shaft when required can be mechanically connected to at least one of the wheels of the vehicle through the mechanical gear box for driving the at least one of the wheels. Furthermore it comprises an energy storage and at least one engine side electric motor and at least one tire side electric motor. At least two different electric motors are thus provided and they are connected to the energy storage and are supplied with electric power from the energy storage for providing or receiving mechanical power or torque when required. Connection means are connected to the electric motors, to the output shaft of the thermal engine and to the wheel or wheels for mechanically connecting the engine side electric motor to the output shaft of the thermal engine to be driven by the thermal engine and for mechanically connecting the tire side electric motor to the wheel or wheels for driving it/them.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

In FIGS. 4a–f and 6 embodiments of a hybrid power train of a PSHV system type having enhanced performance are shown.

Figure 4A:
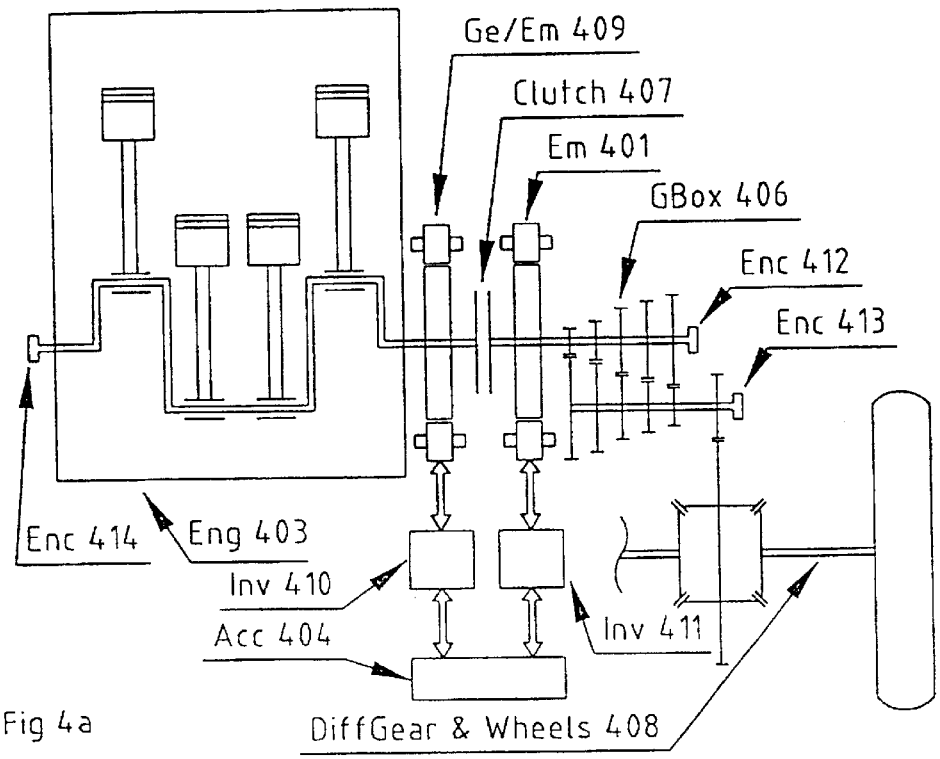
FIG. 4a is a schematic picture, partly in block shape, of a parallel serial hybrid vehicle system comprising two electric motors on the thermal engine side of a gearbox.
Figure 4B:
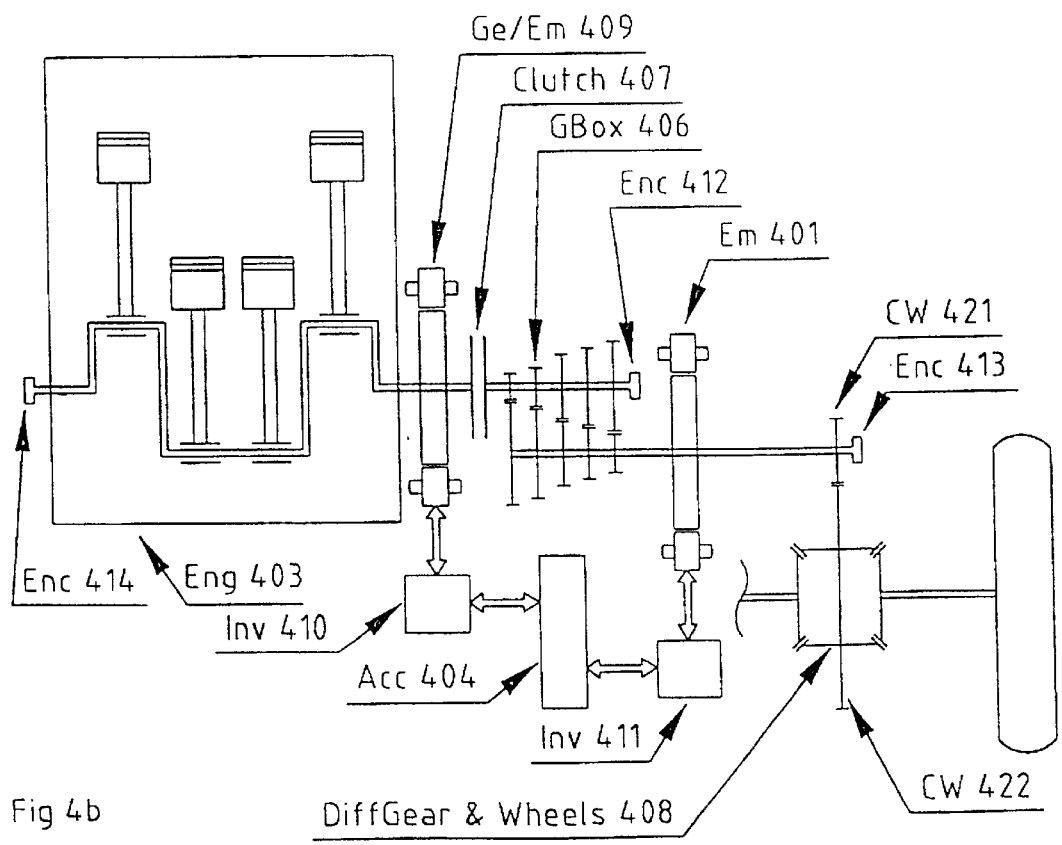
FIG. 4b is a schematic picture similar to FIG. 4a of a parallel serial hybrid vehicle system comprising one electric motor on the thermal engine side of a gearbox and one electric motor Is on the other side of the gearbox.
Figure 4C:
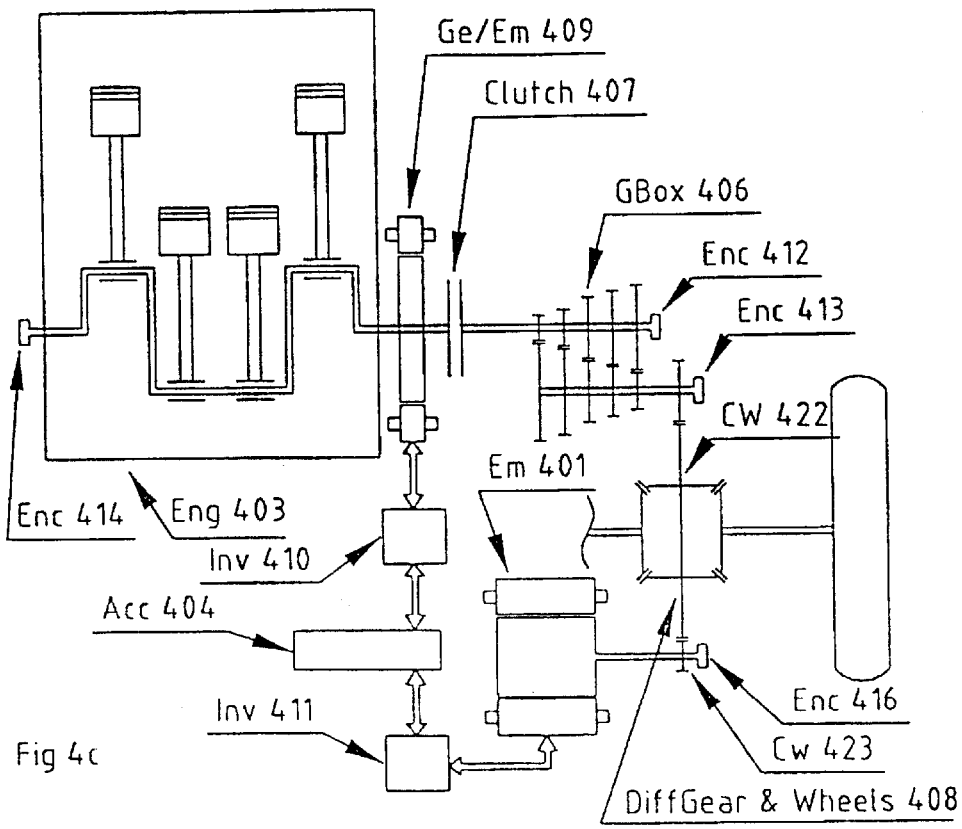
FIG. 4c is a schematic picture similar to FIG. 4a of a modified parallel serial hybrid vehicle system comprising one electric motor on the thermal engine side of a gearbox and one electric motor on the other side of the gearbox.

In FIGS. 4a and 4c two most preferred embodiments of the hybrid powertrains are shown. Both embodiments include the classic thermal engine powertrain including a thermal engine 403, a clutch 407 and a gearbox 406. To this configuration two electric motors are added. One electric motor 409 is closely connected to the thermal engine, driving the shaft thereof or being driven thereby using some mechanical transmission and thus operating both as an electric generator and an electric motor. The other electric motor 401 is connected on the tire side of the clutch, driving some shaft in the transmission path from the clutch to the wheels or tires of the vehicle, this electric motor also using some mechanical transmission means. In the embodiment of FIG. 4a the second electric motor 401 is placed on the thermal engine side of the gearbox and in the embodiment of FIG. 4c on the tire side of the gearbox.

The basic arrangement including a thermal engine, a clutch and a gearbox has dominated conventional vehicles for almost a century, and one likely reason thereof is that it is one of the best solutions available in terms of cost, performance and efficiency. By adding one electric motor on each side of the clutch, the engine load can be kept continuous even during shifts of the gear position or speed as the power from the engine can be absorbed by the electric generator/motor 409 and transferred to the other, traction motor 401. This permits the thermal engine to operate without the pollution generating transients between high torque (with engaged clutch) and basically no torque (disengaged clutch).

Thus, in the parallel serial hybrid vehicle system of FIG. 4a, a thermal engine 403, e.g. an internal combustion engine, has an output shaft which is connected to an input side of a clutch 407. The opposite, output side of the clutch 407 is connected to a gear box 406, the output shaft of which drives the differential gearing and the wheels 408. When the clutch 407 is engaged, the thermal engine 403 is mechanically connected to the differential and wheels 408 through the clutch 407 and the gear box 406. In this mode the thermal engine 403 will be locked in speed to the wheels 408 by one of the available reduction ratios of the gearbox 406, and possibly the reduction ratio in the path between the gear box 406 and the differential gearing 408. By a suitable selection of reduction ratios to fit the legal speed limits, the most common highway (=long distance driving) speed limits can be made to be close to the optimum speed of the thermal engine 403. Long distance driving can therefore be done having the thermal engine 403 running close to an optimum speed and an optimum torque. The balance between optimal thermal engine torque and wheel torque requirement can be absorbed or delivered through an electric generator/motor 409 and/or an electric motor 401. The electric generator/motor 409 is directly mechanically connected to the output shaft of the thermal engine 403. It can as illustrated have its shaft in common with the output shaft of the thermal engine or have its rotor rigidly attached to the output shaft. The electric motor 401 is in a similar way directly mechanically connected to the output side shaft of the clutch 407 by e.g. having its shaft in common with said output side shaft of the clutch or its rotor rigidly attached to this shaft. The electric generator/motor 409 and the electric motor 401 are both connected to an electric energy storage 404 such as an electrochemical battery, the connection being obtained through inverters 410, 411 respectively.

The various parts of a complicated drive train as discussed above in conjunction with FIGS. 1–4a are controlled by a suitable controller, not shown, e.g. a suitable microprocessor, which controls at least the thermal engine, the electric motors and the generator/motor to drive the wheels and to charge or discharge the electric energy storage. The control is based on among other things the speeds of the various shafts of the system. In FIG. 4a the control uses electrical signals representing the speed of the input shaft of the gearbox as obtained from a speed sensor or position encoder 412, the speed of the output shaft of the gearbox as obtained from an encoder 413 and the speed of the engine shaft as obtained from an encoder 414. Similar controllers are of course used for the powertrains as illustrated in FIGS. 4b–4f and 6 to be described hereinafter.

The operation of the PSHV systems as disclosed herein will be described for different configuration modes. Basically, such a system can be run as en electric vehicle, i.e. when the thermal engine is switched off, as a series hybrid vehicle, i.e. when the thermal engine is switched on and the clutch is disengaged, and as a parallel hybrid, i.e. when the thermal engine is switched on and the clutch is engaged.

Now the transfer efficiencies of the various powertrains of FIGS. 1–4a will be discussed and then some assumptions on efficiencies of the incorporated components will be used. It is thus assumed that the efficiency of a gear in which the forces transferring torque pass a single cog surface barrier can be set to 0.98 and that the efficiency of an electric motor and its inverter can be set to 0.90. The discussion of the powertrain of FIG. 4a has also relevance for the powertrains of FIGS. 4b–f and 6 which will be described hereinafter.

Figure 2:
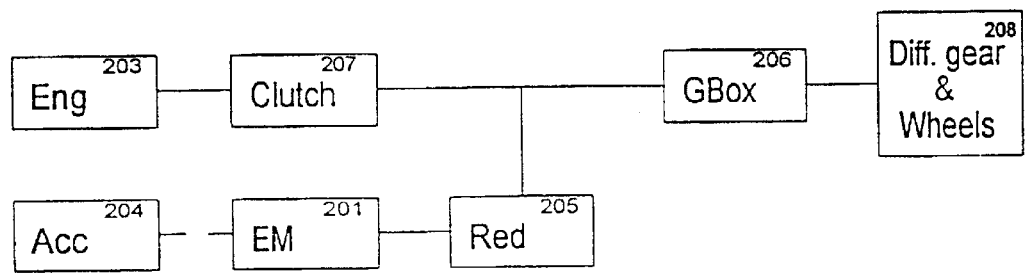
FIG. 2 is a block diagram of a parallel hybrid vehicle system.

Both the PSHV system of FIG. 4a and the PHV system of FIG. 2 will under this assumption have a transfer efficiency of about 0.98 from the thermal engine through the engaged clutch and through the gearbox.

Figure 3A:
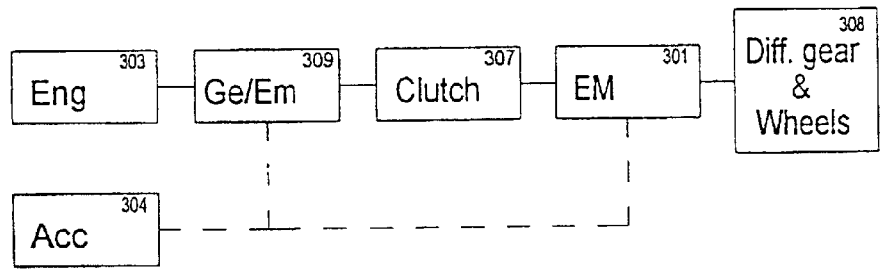
FIG. 3a is a block diagram of a parallel serial hybrid vehicle system having a fixed transmission ratio between a thermal engine and the wheels of the vehicle.
Figure 3B:
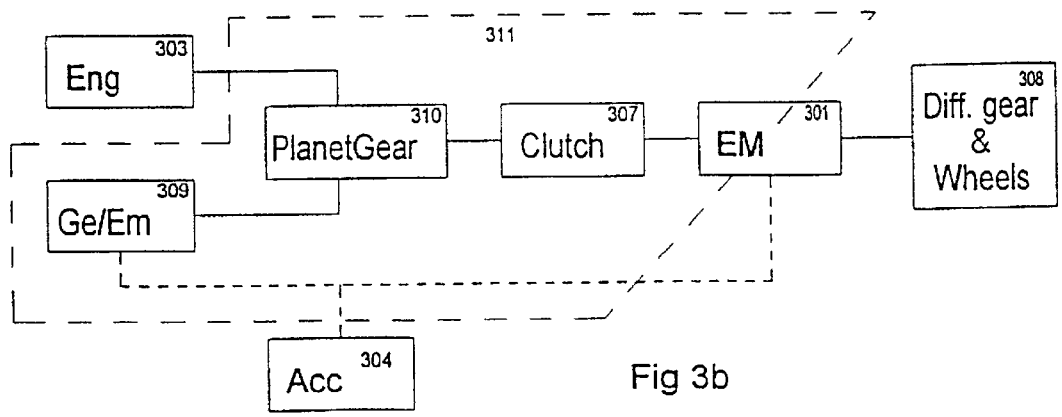
FIG. 3b is a block diagram of a parallel serial hybrid vehicle comprising two electric motors and a planetary gear device connected between a thermal engine and the wheels of the vehicle.

The transfer efficiency of the PSHV system of FIG. 4a is better than that of the PSHV system of FIG. 3b. A part of the torque from the thermal engine 303 of the PSHV system of FIG. 3b to the clutch 307 goes through a single cog surface barrier with an efficiency of about 0.98. The other part passes however through a single cog surface barrier, the electric generator/motor 309 and its associated power electronics and the motor 301 and its associated power electronics. The transmission efficiency of this path is about 0.98·0.90·0.90=0.79. Using the assumptions given above, the total transmission efficiency of the PSHV system of FIG. 3b will therefore vary from a value close to 0.79 to a value close to 0.98.

Figure 1:
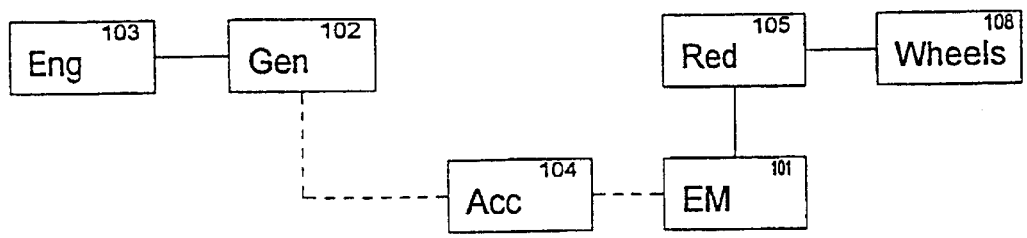
FIG. 1 is a block diagram of a serial hybrid vehicle drive train system.

The transfer efficiency of the PSHV system of FIG. 1 is obviously lower than that of all other systems in FIGS. 2–4a since it uses two motors/generators connected serially and thus has a total efficiency of about 0.90·0.90=0.81.

The total efficiency of the mode of the powertrains of FIGS. 1–4a in which the clutch is engaged also depends on the efficiency of the devices which store excess power delivered by the thermal engine to the accumulator and add power from the accumulator to the wheels. In the following, this is called "Accumulator path efficiency".

The accumulator path efficiency of the PSHV system of FIG. 4a is slightly better than that of the PHV system of FIG. 2 due to a marginally higher efficiency when one of the two motors 401, 409 is idling. Since the PSHV system of FIG. 4a has two electrical machines 401 and 409, its controller, not shown, can choose between running both electric motors, thus reducing copper losses, or to run one electric motor having the other electric motor rotating idle, thus reducing iron losses of the electric motors. As an illustration, assume that the electric motors 401 and 409 are identical having an equivalent electrical resistance R. Running both electric motors at the same torque using a current I will result in a copper loss of $2 \cdot RI^2$; running one motor at twice the torque will result in a copper loss of $R \cdot (2 \cdot I)^2$ or $4 \cdot RI^2$, which is twice the copper loss of the first case. On the other hand, activating an electric motor using current from an inverter will induce iron losses in the electric motor since the motor inductance will have to balance the voltages switched over its coils. It may therefore at lower loads be advantageous to run only one electric motor having the other motor idle. Providing electric motors having different characteristics increases the possibilities of improving efficiency by activating only one electric motor.

The accumulator path efficiencies of the PSHV systems of FIG. 4a and of FIG. 3b cannot be easily ranked. The disadvantage of the powertrain of FIG. 3b is that the planetary gear will impose relations between the speed and torque of the thermal engine 303, the electric generator/motor 309 and the electric motor 301. This will force the controller, not shown, to seek compromises. If the thermal engine is working at optimum power efficiency speed and torque, the transfer efficiency and accumulator path efficiencies might be poor. If the transfer efficiency and accumulator path efficiencies are good, the thermal engine might be working at far from optimum power efficiency speed and torque. It seems likely that this will result in compromises in which both the thermal engine, transfer and accumulator efficiencies will suffer.

A first object of the invention which comprises providing a PSHV system having a high overall efficiency path from the thermal engine of the system to the wheels of the vehicle, therefore seems fulfilled by the system according to FIG. 4a and also by those according to FIGS. 4b–4f and 6.

Thermal Engine Efficiency

A second object of the invention is to provide a PSHV system which permits the thermal engine to operate at a high overall efficiency. Obviously the thermal engines of FIGS. 1, 3a, 3b, 4a and also those of FIGS. 4b–4f and 6 can all be selected to run at an optimal load point in the serial mode, i.e. for FIGS. 3a, 3b, 4a–4f when the clutch 307 or 407 respectively runs freely. As pointed out above, the PSHV system of FIG. 3b can in principle run at the thermal engine optimal efficiency point for any vehicle speed also in the parallel mode when the clutch 307 is engaged, but at a penalty of lower transfer and accumulator efficiencies.

A disadvantage of the powertrain of FIG. 4a and also of that of FIGS. 4b–4f and 6 is that the speed of the thermal engine cannot be set independently of the vehicle speed. This disadvantage will be diminished if the thermal engine 403 has a high efficiency over a fairly wide rpm range or speed range and/or the gearbox 406 has many ratios.

To permit a comparison with prior art hybrid systems a simulation model has been built.

The simulated vehicle shown in table 1 is based on the automobile 318i/328i manufactured by the company BMW. The current power train has been replaced by an Opel C18NZ internal combustion thermal engine, two electric motors in the configuration shown according to FIG. 4a and a currently available gear box and front wheel drive differential. The mass has been increased by about 120 (=140–20) kg. The additional mass of 140 kg includes the mass of 2 electric motors, inverters, and the accumulator batteries and hopefully leave sufficient margins to encompass cabling, battery cell encasement and other ignored components. The mass of the fuel tank has been reduced by 20 kg.

The C18NZ thermal engine was used in the Opel Vectra and is selected because a non-confidential thermal engine efficiency map was available. The efficiency map is based on measurements made in Finland and has been obtained from Mr Olavi H. Koskinen, Chief engineer, Ministry of Transport and Communications, P.O. Box 33, FIN-00521 HELSINKI, Finland.

The battery system assumed is 120 UHP NiMH cells type 17 from the company Varta. The battery model used was too conservative. A NiMH model used by another highly qualified research group gives a noticeably lower fuel consumption for the vehicle, and recently received data on existing NiMH cells show a higher charge-discharge efficiency than that which was used in the simulation model.

Electric motor and inverter efficiencies have been simulated using data published by Unique Mobility, Inc. for the Unique Mobility SR218H motor and CA-40-300L inverter as published by UQM on the Internet at www.uqm.com.

The components have been selected because non-confidential data are available. The two electric motors have the same specification. The simulations do therefore not show an optimized vehicle. It seems reasonable to assume that the fuel consumption would be lower if specially developed components had been used and if the maximum torque and speed had been selected for the application from a wide selection of already available components.

The tires used for the simulations of the vehicle having "current" tires have a static rolling friction of 0.09 N/kg and a dynamic friction of 0.0018 N/kg/(m/s). For the simulations of the vehicle with "improved" tires these two values have been reduced by 30%.

No non-confidential data on high efficiency thermal engines has been available. For the simulations of the vehicle having "improved" tires and thermal engine, the fuel consumption of the C18NZ has been reduced by a factor of 220/262 (from 262 g/kWh to 220 g/kWh). This corresponds to 38% thermal efficiency as claimed for the motor-car Prius from the company Toyota. Peak efficiency data for the Prius car are taken from an efficiency plot in an EVS-14 conference paper by Sasaki et al., "Toyota's Newly Developed Electric-Gasoline Thermal engine Hybrid Powertrain System", 1997. The model of the "improved" tires and thermal engine therefore assumes that the efficiency of the advanced thermal engine varies with torque and speed in the same manner as that of the C18NZ.

To permit simple direct comparisons of the fuel consumption, the controller driving strategy has been adjusted to obtain the same battery charge before and after the driving cycle. Almost no effort has been made to optimize strategy in other ways.

To make it possible for independent researchers to check the efficiencies of the simulations, a detailed listing of the energy flow and losses for the ECE (European mixed driving cycle) has been prepared in 6096 0.2 sec steps. The vehicle shown in these listings has a vehicle mass of 1561 kg, an area of 2.22 m$^2$ and a Cv of 0.28.

The simulation results as shown in this listing have been checked by two research workers at the Royal Military College of Science, Cranfield University, UK, who worked independently of each other. No significant errors were found.

The simulation model has also been checked by running it for a conventional vehicle using a detailed thermal engine efficiency map for a vehicle which had been supplied under a Confidentiality Agreement. The simulation model gave a slightly lower (1.2%) fuel consumption than the real life tests.

The simulation model and the verification have been focused on fuel consumption. Acceleration has been modelled in a straightforward way to get a first idea of the potential. Acceleration data have not been verified by any independent researcher.

The simulation model ignores thermal engine start up energy consumption. Preliminary measurements of thermal engine start up fuel consumption indicate that the start-up will increase the consumption values shown by 1 to 2%. The model of the electric motors does not consider the effects of battery voltage variations (The Unique Mobility data are only given for constant battery voltage).

The present simulation always starts the thermal engine up to about a start point having a predetermined speed (1200 rpm) and a predetermined torque (100 Nm). Only when this operating point is almost reached the control system will start to adjust the thermal engine speed and torque to fit the speed required for a closed clutch. This control method is intended to simplify start up exhaust control but will result in an unnecessary long time in the serial mode and a higher fuel consumption.

According to the verification efforts described above, the model seems to be sufficiently reliable to permit some conclusions of the efficiency of the proposed powertrain when compared to prior art designs.

TABLE 1

Simulation model results.

| | Col. A | Col. B | Col. C | Col. D | Col. E | Col. F | Col. G | Col. H |
|---|---|---|---|---|---|---|---|---|
| Powertrain type | Conv | Conv | Hybrid | Hybrid | Hybrid | Hybrid | Hybrid | Hybrid |
| Tires and engine | n.a. | n.a. | current | improved | current | improved | current | improved |
| Area, $m^2$ | 2.08 | 2.06 | 2.08 | 2.08 | 2.08 | 2.08 | 2.08 | 2.08 |
| Drag coeff. Cd | 0.27 | 0.29 | 0.27 | 0.27 | 0.27 | 0.27 | 0.27 | 0.27 |
| Vehicle mass, kg | 1360 | 1470 | 1480 | 1480 | 1480 | 1480 | 1480 | 1480 |
| Driving cycle | ECE | ECE | ECE | ECE | 10-M | 10-M | FTP | FTP |
| Spec. cons. liters/100 km (EU) | 8.4 | 9.6 | 4.15 | 2.96 | 3.37 | 2.45 | 3.77 | 2.65 |
| Spec. cons. km/liter (JAP) | 11.9 | 10.4 | 24.1 | 33.8 | 29.6 | 40.7 | 26.5 | 37.7 |
| Spec. cons. mpg (US) | 28.0 | 24.5 | 56.7 | 79.5 | 69.7 | 95.9 | 62.4 | 88.7 |
| Engine relative efficiency, % | | | 95.1 | 94.4 | 94.1 | 94.3 | 94.2 | 94.2 |
| Time to 100 km/h, s | 10.7 | 7.4 | 7.8 | | 7.8 | | 7.8 | |
| Time to 130 km/h, s | 17.7 | 12.0 | 13.0 | | 13.0 | | 13.0 | |

Some Results From the Simulations:
1. The average thermal engine efficiency is 94 to 95% of the optimal efficiency. The average efficiency of the thermal engine is surprisingly high and rather constant for the three different driving cycles used. The average efficiency depends on the characteristics of the thermal engine. In the three columns above for "current" thermal engine and tires, data for the Opel C18NZ thermal engine have been used. The C18NZ was not designed for use in hybrid powertrains. Future thermal engines designed for use in hybrid powertrains could give an even better average efficiency when used with the hybrid powertrain as proposed herein.
2. In the ECE driving cycle (the one verified by external researchers), of 100 energy units which could have been obtained if the engine was to run at its optimum speed and torque, 95 energy units (on the average) was obtained as mechanical power on the output shaft of the thermal engine. Of these 95 energy units, 74 were directed to the gear box and 71 reached the tires through the mechanical chain. Another 21 energy units are directed to the electric link.
2. The fuel consumption is very low. This is what could be expected when a very high average efficiency of the thermal engine is combined with a predominantly mechanical, high efficiency transfer from the thermal engine to the tires.
3. The transients in the thermal engine torque and speed are small. This should give low emission levels, similar to the levels already demonstrated for hybrid powertrains using planetary gears.
4. The fuel consumption is approximately ⅓rd of present fuel consumption.

At the time of writing, the automobile Prius manufactured by Toyota seems to be the most efficient hybrid powertrain vehicle known. Data given for the Prius are related to the fuel consumption when tested using the Japanese 10-Mode test cycle. The model of the powertrain of FIG. 4a has been run against the same (?) test cycle, see table 1, column F. The fuel consumption of the 1530 kg Prius is given as 28 km/liter whereas the simulation model indicates a consumption of 41 km/liter for a 1430 kg vehicle. Both simulations refer to a vehicle having a peak thermal engine efficiency of 38%, using high power NiMH batteries, two electric motors, low friction tires and a low Cd value (0.30 against 0.27). The mass of the Prius is based on verbal communications from competitors which have purchased a Prius.

The simulation model shows that the average relative efficiency of the thermal engine is 94 to 95% when an thermal engine designed for another type of vehicle is combined with a standard gear box designed for another type of vehicle. It seems very likely that systems using thermal engines and gear boxes designed to fit powertrains according to FIG. 4a would give an even better average efficiency.

A second object of the invention, which is to provide a PSHV system which permits the thermal engine to operate at a high overall efficiency, therefore seems fulfilled.

Speed and Torque Variations

A third object of the invention is to provide a PSHV system which avoids variations of speed and torque of the thermal engine faster than what is compatible with goals for emissions and efficiency.

The diagram of FIG. 5 illustrates some basic performance possibilities of the parallel/serial hybrid system of FIG. 4a. The diagram illustrates a simulation in which a vehicle is driven during a 52 second start-stop movement typical of city traffic. In this case the simulation model is based on data from a thermal engine which is less suited than the C18NZ.

During the first 4 seconds in FIG. 5 the vehicle is driven by the electric motor 401. The torque and the speed of the electric motor 401 are shown as "507 mot torque" and "508 mot rpm" in FIG. 5. The speed and torque of the wheels (tires) are shown by curves 501 and 502. Power to the electric motor 401 comes from discharging the battery, shown as "510 Batcharge" in FIG. 5, the power being negative during the first 4 seconds of FIG. 5.

Some 3 seconds after vehicle start, the controller, not shown, will cause the electric generator/motor 409 to force the thermal engine 403 to start. In the control method shown, the start up always follows the same pattern up to a fixed thermal engine entry point having a moderate speed and high torque. Using one or a few start up ramps facilitates optimal control of exhaust transients. As long as the clutch 407 is disengaged, the electric generator/motor 409 absorbs the thermal engine power as shown in curve "505 gen torque". This causes a short positive charging of the battery as shown, see the curve 510.

The vehicle controller, not shown, seeks to adjust the gearbox setting to the values estimated to be optimal, and to adjust thermal engine speed and torque to permit a low slip clutch engagement. In the case shown, the gear is changed from 1 to 2 and the clutch 407 can be engaged, see curve 509, about 4.5 seconds after vehicle start.

At the 7:th second, the controller initiates a gear change, indicated by the box "511 gear change event" in FIG. 5. The gear change shown is made without driver intervention. The electric generator/motor 409 will absorb the torque from the thermal engine 403 by rapidly increasing its torque, see curve 505, thus permitting a slip-free opening of clutch 407, see curve 509. The vehicle controller will also reduce the torque, see curve 507, of the electric motor 401 to zero. The controller can now disengage the previous gear as virtually no torque is transferred over it and rapidly change the speed of the electric motor 401 to fit the required speed for the forthcoming gear. Using the speed/position encoders 412 and 413 connected to the input and output shafts to the gear box 406, see FIG. 4a, the speed and also the relative position of the two shafts can be synchronized to permit a virtually slip-free engagement of the forthcoming gear position.

The clutch 407 is now open as shown by the curve 509 "Clutch" and the thermal engine torque 504 is absorbed by the electric generator/motor 409, see curve 505. In the case shown, the electric generator/motor 409 will absorb the power of the thermal engine during about one second until the thermal engine speed has been adjusted enough to permit a low slip clutch closure, which happens in the end of the time slot shown in the box 511 indicated by "gear change event". The encoder 414, see FIG. 4a, provides information on the rotation speed of the output shaft of the thermal engine 403.

As can be seen, the transients in the thermal engine torque, curve 504, and speed, curve 506, are small. The thermal engine speed and torque change rate can be selected by parameters input to or set for the controller. In this way mechanically identical vehicles can be given different properties in different markets or different areas by setting different weight to emission levels and efficiency.

As shown, the gear change will neither affect the load on the thermal engine 403, nor the response of the vehicle assuming that the power available from the electric motor 401 is sufficient to give the required performance. As seen in the curve 502 indicated by "tyre torque", disengaging the clutch will only cause a short absence of torque provided to the tires. Since the gear change can be made very fast, the no-torque period is shorter than in conventional vehicles. During engaging and disengaging, the clutch will carry very small torque, and will therefore experience very small slip and wear.

In the figure, the torque from the electric generator/motor 409 is always positive, i.e. it is working as a generator. A more detailed simulation would have shown it to work as a starter motor, and an optimum use of the two electric machines in the parallel hybrid mode would most likely have resulted in that in some instances both electric motors would have been used as electric motors or as generators, even if one electric motor is mostly used as a generator and the other electric motor is mostly used as a motor.

In systems or driving situations in which power performance is given priority over exhaust levels, high power gear changes can be achieved. The electric generator/motor 409 can rapidly force the speed of the thermal engine 403 down to the speed anticipated to fit the gearbox input speed after the gear change. This permits a very short time period with a reduced power to the wheels while still maintaining an almost slip-free operation of the clutch.

A third object of the invention is to provide a PSHV system which avoids variations of speed and torque of the thermal engine faster than what is compatible with goals for emissions and efficiency and this object thus seems fulfilled.

Thermal Engine Switched Off

When the thermal engine is switched off, the main difference between the powertrains according to FIGS. 1–3b and the embodiments of FIGS. 4a–4f and 6 is the existence of a mechanical gearbox connected between the electric traction motor and the tires. A gearbox permits the controller to select a gear position which gives the highest efficiency for the electric motor/inverter combination and also permits electric motors having a lower maximum torque to drive the vehicle on ascending slopes. The 5-speed gearboxes used in contemporary vehicles permit a range of approximately 1 to 5 for the input speed at a given vehicle speed. This permits the electric motor 401 of FIG. 4a to have the same top speed as the electric motor of FIG. 4c but at only ⅕th of the rated torque. Alternatively, the two electric motors may have the same rated torque but in that case the electric motor working in the embodiment of FIG. 4a will only run at ⅕th of the speed at high vehicle speeds. For electric motor designs using permanent magnets the iron losses at high speeds and low loads are considerable. The advantage of a low top speed may more than compensate for the disadvantage of having one more cog transfer between the electric motor and the tires.

Like in all serial hybrid systems, the electric generator/motor 409 can act as a starter motor of the thermal engine.

Power Peaks

During high power operation, such as hill climbing or overtake, a PSHV system as that of FIG. 4a should normally operate having the clutch 407 engaged.

When compared to the powertrains of FIGS. 1–3b, the powertrains of FIG. 4a and also of FIGS. 4b–d, see the description hereinafter, can divide the required mechanical power between the two electrical motors 401 and 409 and the thermal engine 403, and divide the required power supply between the accumulator 404 and the thermal engine 403.

This gives an advantage compared to the powertrain of FIG. 1, in which the full mechanical power must be provided by only the electric motor 101. The electric motor 101 of the serial hybrid system of FIG. 1 must therefore have a much higher rating than the electric motors of FIGS. 4a–d and 4f. As part of the engine power in the PSVH of FIG. 3b passes through the electric motors 309 and 301, at least the electric motor 301 must have a higher rating than the corresponding electric traction motor 401 in the power trains of FIGS. 4a–d and 4f. As part of the power of the thermal engine in the PSVH of FIG. 3b passes through the electric motors 309 and 301, at least the electric motor 301 must have a higher rating than in the power trains of FIGS. 4a–4d.

Reliability

Some components of a hybrid vehicle system, particularly the accumulators, will in the beginning have little proven record of reliability. This may be a serious obstacle to a wide market acceptance of hybrid powertrain vehicles. At the time of writing, hybrid vehicles must either use time proven low capacity lead-acid batteries, resulting in a low performance, proven but very expensive NiCd batteries or systems like lithium or NiH pulse batteries or supercapacitors, which may have a potential to become affordable but which has an unproven reliability. A fourth object of the invention is therefore to provide a PSHV system which gives an acceptable or at least tolerable performance if the accumulator and/or the electric motor system capacity should be reduced or even if the electric motor system ceases to operate.

This is only possible for the PHV system of FIG. 2 and the PSHV system of FIGS. 4a–4f, in both cases assuming the existence of a starter motor, not shown, similar to that of a conventional car or automobile. The PSHV system of FIG. 3a is similar to a conventional car with the gearbox locked in gear position No. 4 and is therefore unlikely to be able to start. The PSHV system of FIG. 3b has the same problem if the error conditions will lock the electric motor 309. If the error conditions will permit the electric generator/motor 309 to spin freely, it will eliminate any output torque to the wheels even if the thermal engine 303 runs at full speed.

Other Objects

A fifth object of the invention is to provide a PSHV system which is capable of recharging its accumulator even when the vehicle is stationary. This is possible for all the powertrains according to FIGS. 1–4f, assuming that a brake, not shown, permits locking the shaft between the planetary gear 310 and the clutch 307 of the PSHV system of FIG. 3b.

A sixth object of the invention is to provide a PSHV system having a longer service life and a lower cost and particularly a dramatically reduced slip and other moving friction forces on components like clutch and gearbox components during shifts of the gear position. This is obtained by the capability of the electric motors 401 and 409 of absorbing torque from the thermal engine and supplying all vehicle movement torque before a clutch release and of synchronising the gearbox shafts at shifts of gear position. The use of the electric motor 401 to synchronize the gearbox 406 permits a longer gear box life for the same component quality or permits the use of parts of low costs. The cost and mass of the gearbox may be reduced further as components etc. required for the synchronisation in manually operated gearboxes can be eliminated. This might also reduce the mechanical losses in the gearbox.

A seventh object of the invention is to provide a PSHV system capable of driving the vehicle when ascending long steep slopes. This is provided by the gear box, thus permitting large tire torques delivered by a moderate size electric motor 401 and/or thermal engine 403. As the thermal engine power is transferred by a highly efficient, predominantly mechanical transmission, the losses and the rise of temperature in the transmission components win be low. The powertrains of FIGS. 1 and 3a will transfer all power at low vehicle speed through the electric motors 102, 101 and 309, 301 respectively, and the powertrain of FIG. 3b will as described above transfer part of the thermal engine torque through the electric motors.

An eighth object of the invention is to provide a PSHV system capable of driving the vehicle when descending long steep slopes, which is provided by the gear box and clutch permitting the thermal engine 403 to operate as an air compressor which can absorb the excess power which the accumulator 404 cannot receive or accept.

A ninth object of the invention is to provide a PSHV system capable of delivering occasional high power peaks for comparatively modest power ratings of electric motors and the thermal engine. This is achieved since the thermal engine power at power peaks is transferred mechanically, whereas the powertrain of FIG. 1 will transfer all the power of the thermal engine through the electric motors 102, 101 and that of FIGS. 3a and 3b will transfer part of the thermal engine power through the electric motors 309 and 301.

A tenth object of the invention is to provide a PSHV system which utilizes investments already made in designs and automated equipment for manufacturing thermal engines of moderate sizes and gearboxes of normal sizes. Depending on the design goals, the gear box of a PSHV system as of that of FIGS. 4a–f can be considerably simplified compared to the gear boxes of conventional cars. To maintain the ability to operate even with failing electric motors and/or accumulator, a reverse gear is required. If a full operating ability for failing electric motors and/or accumulator is not considered necessary, the reverse gear can be eliminated, thus reducing cost and weight.

An eleventh object of the invention is to provide a PSHV system which permits the use of electric motors of the permanent magnet type having considerable losses when spinning or rotating at low loads without obtaining high losses for high vehicle speeds. This is in the embodiments shown in FIGS. 4a–4f obtained by the use of the gearbox.

Other Embodiments

Whereas the embodiment according to FIG. 4a comprising a single clutch 407 and an electric motor 401 mounted on the thermal engine side of the gearbox 406 has been used in the discussion above, most of the advantages can be obtained with some other structures.

In FIG. 4b is shown an embodiment of a PSHV system similar to that of FIG. 4a but having the electric motor 401 connected on the tire side of the gearbox 406. The electric motor 401 is thus connected between the gearbox 406 and the differential gear, such as having its shaft in common with the output shaft of the gearbox. This eliminates the loss of torque during a gearbox change, giving the advantage of a smoother acceleration. In this case, having the electric motor 401 mounted on the outgoing shaft from the gearbox 406, one encoder 413 connected to this shaft can be used both for the commutation and other control data for electric motor 401 and at the same time be used for engaging the clutch with a low slip. The differential gearing is here seen to be driven by a cog wheel 421 on the output shaft of the gearbox 406, the cog wheel 421 cooperating with a cog wheel 422 on the input shaft of the differential gearing. The gear ratio between the cog wheels 421 and 422 normally is in the range of 1:2 to 1:5. Therefore the torque of the electric motor 401 at low speeds must be higher than that of the electric motor of FIG. 4a, which at the lowest gear or speed position has a ratio to the wheels of approximately 12:1.

In FIG. 4c another embodiment of a hybrid power train system is shown which is similar to the system of FIG. 4a but has the electric motor 401 connected on the tire side of the gearbox 406. In this case, the electric motor 401 is mounted on an own shaft. This requires an extra path from the electric motor 401 to the differential and wheels 408. In the embodiment shown, this is arranged by a cog wheel 423 on the shaft of the electric motor 410 cooperating with the cog wheel 422 on the input shaft of the differential gearing. The motor encoder 416 can (except for some unlikely combinations of gears) no longer be used for gear changes made with a low wear. To achieve a low wear gear change, a total of three encoders 412, 413 and 416 are required, the encoder 416 sensing the speed of the output shaft of the electric motor 401. The gear ratio between the cog wheels 423 and 422 can is this case be optimized for the electric motor 401, which in the case of high speed motors often is in the order of 10:1.

Figure 4D:
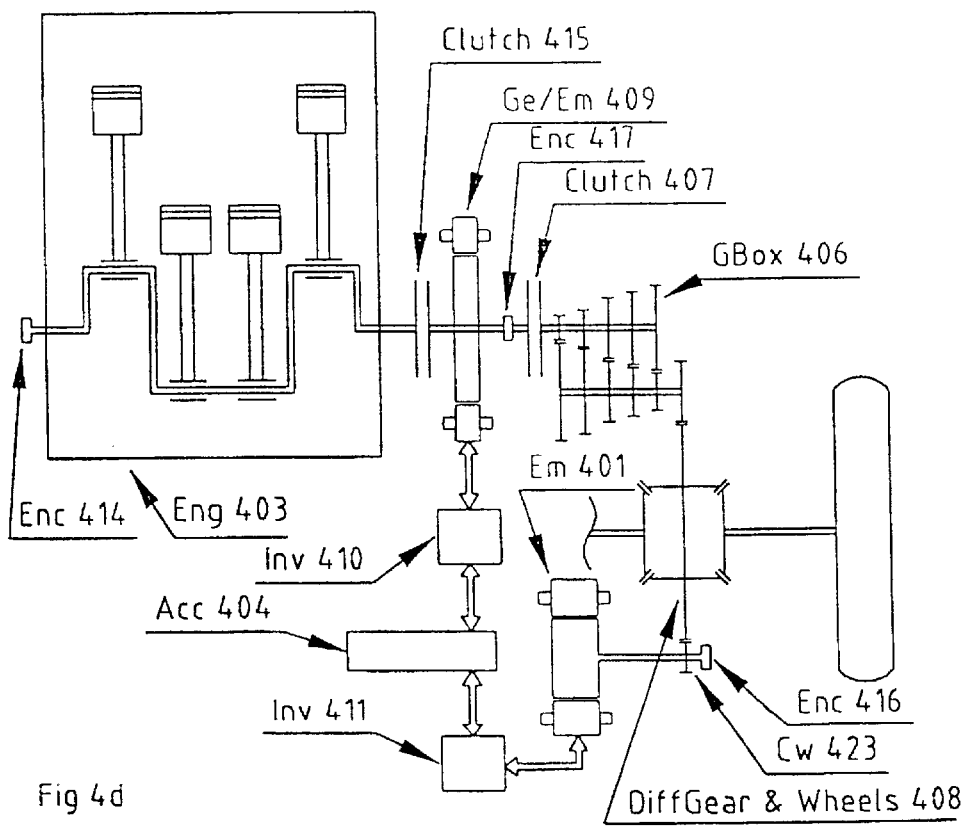
FIG. 4d is a schematic picture similar to FIG. 4a of a parallel serial hybrid vehicle system comprising one electric motor on the thermal engine side of a gearbox and one electric motor on the other side of the gearbox suitable for slow steep slope climbing.

In FIG. 4d yet another embodiment of a hybrid powertrain is shown which is similar to that of FIG. 4c. Another clutch 415 is connected between the thermal engine 403 and the electric generator/motor 409. By adding this second clutch 415 both of the electric motors 409 and 401 can supply torque while the thermal engine is disconnected. The thermal engine 403 can be disconnected using the added clutch 415 while the electric generator/motor 409 can add torque to the wheels through the engaged first clutch 407. This can permit a capability if climbing steep slopes at slow speeds which would otherwise have required a large torque capability of the electric motor 401. In FIG. 4d no encoders are provided having fixed positions in relation to the shafts of the gearbox 406. To permit an adjustment of the position of the gearbox cogs using the electric motor 409, another two encoders would normally be required.

Figure 4E:
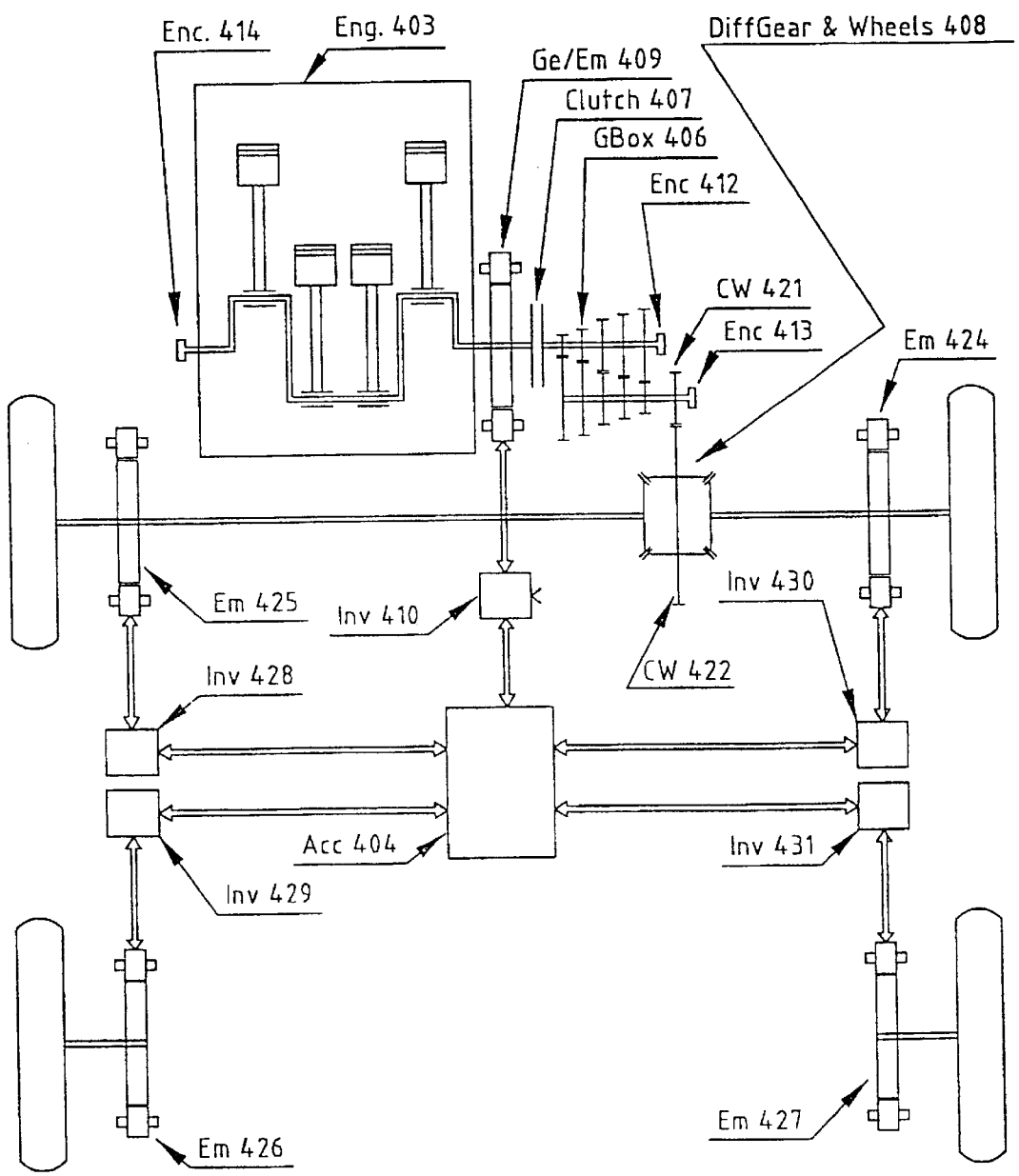
FIG. 4e is a schematic picture of a parallel series hybrid vehicle similar to that of FIG. 4c having one electric motor on the thermal engine side of the gearbox and one electric motor directly connected to each wheel.

In FIG. 4e a parallel series hybrid vehicle system having one electric motor on the thermal engine side of the gearbox and one electric motor 424–427 directly connected to the axle of each wheel is shown, such as having the shaft of the electric motor in common with or assembled to the wheel axle as illustrated. This permits a full regenerative braking for higher decelerations. At decelerations above a certain limit all four wheels should participate to some extent, and this would in the embodiments of FIGS. 4a–4d require the use of friction brakes. For presently available electric motor technology, full braking forces will always be predominantly done using conventional friction brakes. The electric generator/motor 409 connected close to the thermal engine can be generally called an engine side electric motor and the electric motor or motors 401; 424–427 connected close to the wheels can be generally called tire side electric motors or traction motors. The engine side electric motors and the tire side electric motors always have some device for mechanically disconnecting them arranged in the power transmission line from the thermal line to the wheels and tires.

Figure 4F:
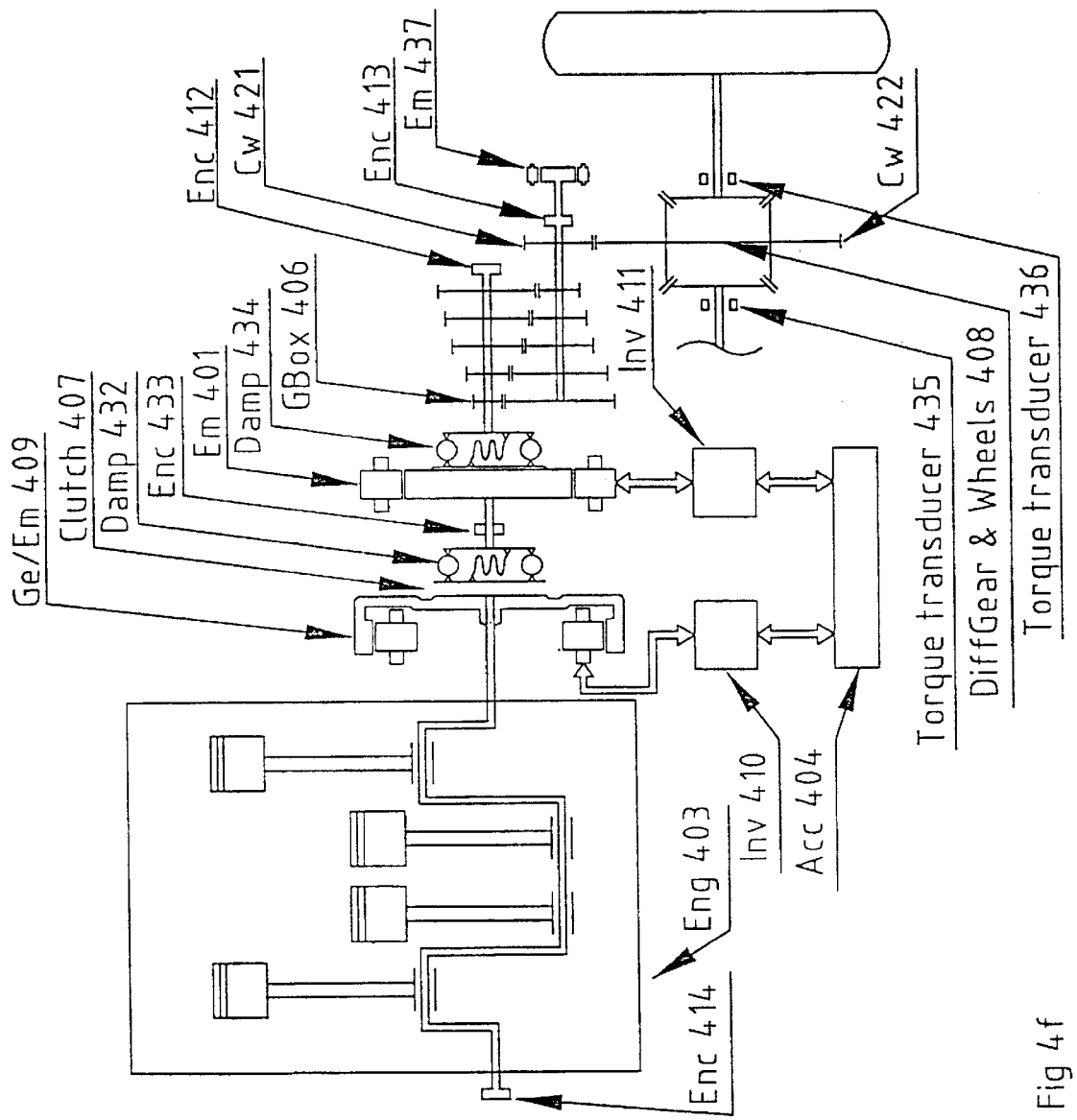
FIG. 4f is a schematic picture of a parallel series hybrid vehicle similar to FIG. 4a showing additional features such as shaft dampers, FIG. 5 comprise diagrams of torque, speed, etc. of the components of the power train of FIG. 4a, and FIG. 6 is a detailed sectional view of some components of a power train according to FIG. 4a illustrating the components with realistic relative dimensions.

In FIG. 4f an embodiment of a parallel series hybrid vehicle system similar to that of FIG. 4a is shown, but some additional features has been added. The electric generator/motor 409 has been illustrated as an outside rotor motor, the rotor enclosing the stator. The active rotor parts are in such motors located radially outside the active parts of the stator. Such a motor may have sufficient inertia to permit it to be used as a flywheel, thus replacing the conventional flywheel. This reduces the extra mass of the hybrid powertrain.

Conventional clutches normally have some torsional flexibility to reduce the torque ripple from the thermal engine. This damping device is shown in FIG. 4f as item 432. Another torque ripple damper 434 has been added between the electric traction motor 401 and the input shaft of the gearbox 406 thus providing two serially connected, mechanical low pass filters to further reduce the torque ripple from the thermal engine. As the encoder 412 in this case does not have any rigid connection to the electric motor 401, an extra encoder 433 rigidly connected to the electric motor 401 has been added.

An electric traction motor such as 401 has a large inertia compared to the part of a normal car clutch which is rigidly connected to the input shaft of a gearbox. This imposes much higher requirements on the regulation of the speed of the electric motor 401 before the next gear position is attempted. As has been described above, the electric motor 401 and its encoder 433 permits a high gain servo loop. This permits the speed and even the phase of the electric motor 401 to be adjusted to the speed and phase of the output shaft of the gear box, the shaft carrying the encoder 413. Transients in the speed of the tires due to obstacles in the road could cause large forces on the gearbox if the splines of a new gear were fractionally in grip when the tire speed transient appears. The damper 434 will dramatically reduce the spline loads from such tire speed transients as the inertia of the motor 401 will be connected through a much softer path.

During a change of gear or speed position the torque and inertia of the electric motor 401 will permit a steady rotational speed of the motor 401. The gears on the gearbox input shaft and its encoder 412 might possibly oscillate. The moments of inertia of the rotor of the electric motor 401 and of the input shaft gears and of the torsion spring in the damper 434 constitute a resonance circuit. If the damping of this circuit is low, any torsional resonance which has been initiated for any reason might continue for a relatively long time. The energy in this resonance circuit is however much lower than the energy stored in the friction plates of a conventional clutch and can be easily absorbed by most clutches.

A resonance which may cause more concern is that one which may develop between the inertia of the gearbox output shaft, the inertia of the differential, the inertia of the tires and their shafts and the elasticity of the cogs on cog wheels 421 and 422 and between the cog wheels in the differential. The elasticity is highly non-linear, being extremely soft when the play between the cogs are open and very stiff when the cogs are deformed during the maximum amplitude of the oscillations between the shafts. Such oscillations may create signals from the encoder 413 which are difficult to distinguish from transients caused by obstacles on the road surface. This problem might motivate the insertion of a torque generation device which in the diagram of FIG. 4f is drawn as a small electric motor 437 connected to the output shaft of the gearbox 406. For the purpose of stabilising the speed of the gearbox output shaft a rather small motor is sufficient. By supplying a suitable torque, the small electric motor 437 can rapidly reduce any oscillations between the output shaft of the gearbox and the differential and/or the tires. In the case of a small electric motor 437, it could detect oscillations using the encoder 413 and actively damp them out. Regardless of type, the device in position 437 should apply its torque before the reduction of the torque from the thermal engine 403 and/or the electric generator/motor 409. It should preferably apply a torque of the same sign as that obtained from the thermal engine 403 and/or the electric generator/motor 409. In that case, the torque transferred through the cog wheels 421 and 422 and the differential gears will keep its sign when the torque from the engine 403 and/or the electric generator/motor 409 is withdrawn.

The control system should seek to maximize the total efficiency of the powertrain. One way to estimate the efficiency of the thermal engine 403 is to measure its speed and torque. These two data will, when inserted in a table, give a good estimate of the efficiency. Even better estimates can be obtained by adding other information such as temperatures in various components of the engine, air pressure after compressors (if any), etc.

Information on the speed of the thermal engine is directly available from the encoder 414 attached to the drive shaft or crankshaft of the thermal engine. When the clutch 407 is non-engaged, thermal engine torque can easily be calculated from the torque of the electric generator/motor 409. The torque of an electric motor can be calculated with moderate accuracy from its electrical current, current phase angle and the temperature of its magnets.

When the clutch 407 is engaged, some other torque measurement method is required. The torsional deformation of one or both of the two elastic dampers 432 and 434 can be used to measure the total torque passing them. Preferably, the encoders should be located close the damper used. One solution is to locate the encoders 433 and 412 close to the damper 434. This requires a sufficient resolution in the encoders 433 and 412. The use of the damper 432 seems to require an additional encoder on the left side of the damper 432.

Instead of using the torsional deflection of dampers 432 or 434, conventional torque measuring devices can be used. In FIG. 4f torque transducers 435 and 436 are placed on the left and right tire axle respectively. In most positions of conventional torque transducers, the torque measured will be the sum of the torque from the thermal engine 403 and one or more of the electric motors 409 and 401. As the torque from the electric motors can be estimated from their currents, etc., as mentioned above, the torque of the thermal engine can be found as the difference between the total measured torque and the torque from the electric motor(s).

Encoders based on magnetic principles seem well suited to the environment close to the shafts. Magnetically biased Hall sensors can sense the position of cog-like parts. They can either be cogs from cogwheels being part of the gearbox or cog-like details protruding from motor rotors, clutch components or similar devices.

A Detailed Design Example

Figure 6:
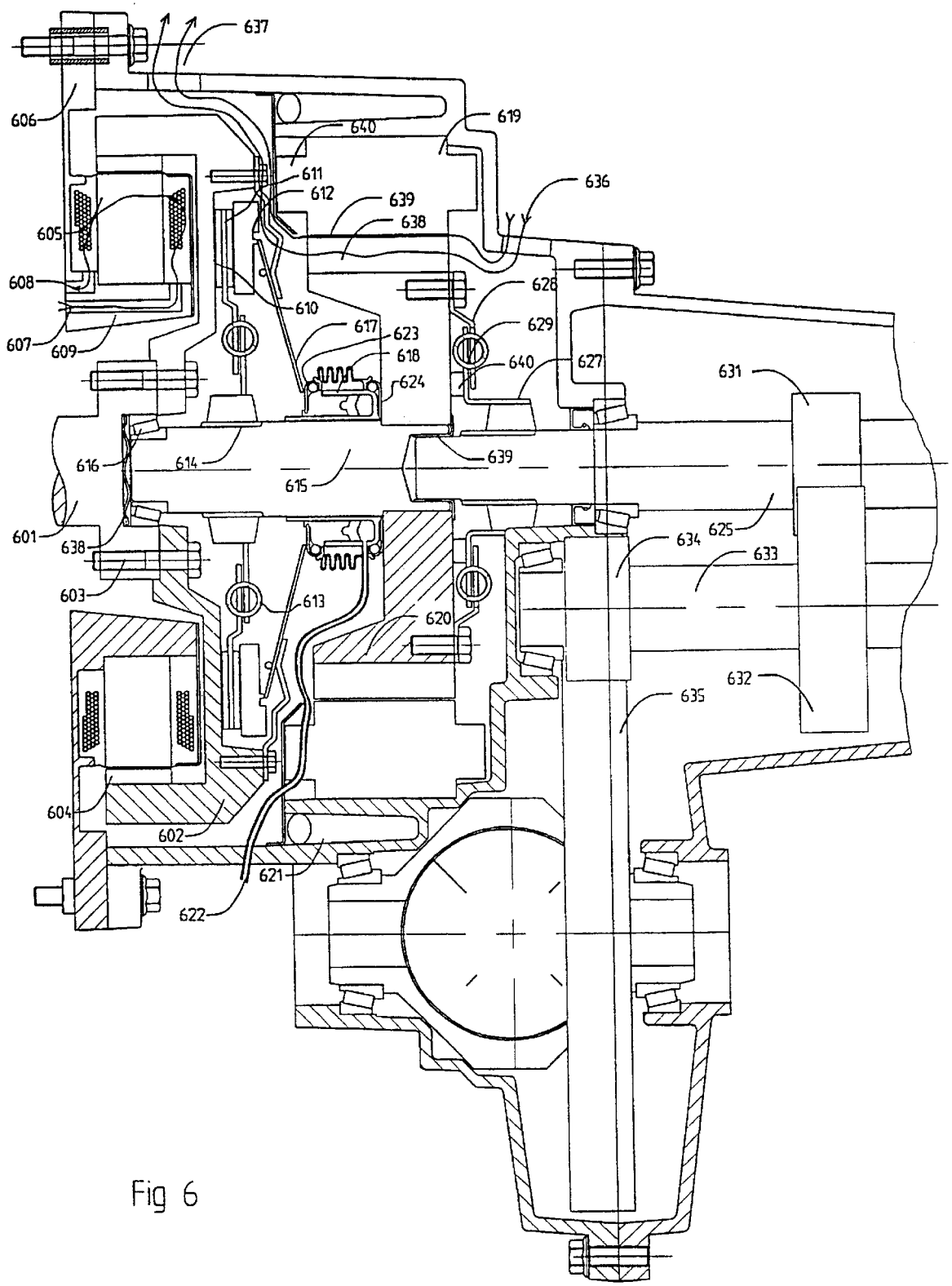

FIG. 6 shows a layout of some of the essential components of a powertrain having an electric generator/motor on the shaft of the thermal engine, a conventional clutch and an electric traction motor on the thermal engine side of the gear box. The layout is intended to illustrate that hybrid powertrains like those shown in FIGS. 4a and 4f can be implemented within acceptable dimensions. As water, oil and air cooling arrangements are illustrated using the same layout, some details are far from optimal for some of the cooling types.

The shaft 601 of the thermal engine has the rotor 602 of the electric generator/motor attached to it using a rigid connection 603 as shown or a connection comprising means for elastic vibration damping, not shown. The rotor 602 has the shape of a cup with the magnets 604 of the electric generator/motor located inside the cup. This gives the electric generator/motor rotor a high inertia which is approximately equal to that of a conventional flywheel. The stator 605 of the electric generator/motor is mounted inside the cup-shaped rotor and is attached to a disc 606 which is mounted to the thermal engine. The cooling of the electric generator/motor stator can be arranged by having oil enter, at 607, from inside the thermal engine as indicated by the arrows of the figure to an exit 608. Water cooling in channels in the stator hub 609 of the electric generator/motor is an alternative cooling method. For somewhat different dimensions and suitable openings in the rotor 602, the airflow from 636 to 637 in the figure could pass the magnets 604 and the stator 605 of the electric generator/motor.

The right surface 610 of the electric generator/motor rotor acts as a component in a conventional clutch also including a conventional friction disc 611 and a pressure plate 612. In the engaged state shown, the friction disc 611 is fixed between surface 610 and member 612. The torque from the thermal engine is transferred through vibration damping springs 613 to a spine 614 on the shaft 615 of the electric traction motor. The pressure on the plate 612 is in the conventional way supplied by a spring 617. The clutch arrangement is quite conventional except that the member 612 is much thinner that normal. This is possible because the heat dissipated is much less than in conventional clutches due to the almost synchronized speeds of the two shafts during clutch closure time.

To release the clutch a hydraulic device 618 is provided. The device shown has a left shield 623 which rotates with the rotor 602 of the electric generator/motor and a right shield 624 that rotates with the rotor 620 of the electric traction motor. The hydraulic device receives for operation thereof oil supplied through a tube 622. The stator 619 of the electric traction motor is cooled by channels 621 around the outer side of the stator for cooling oil or water.

The shaft 615 of the electric traction motor is rigidly attached to its rotor 620. The left part ends in a bearing 616 in the end surface of the shaft 601 of the thermal engine. The other end, i.e. the right part is radially attached to the input shaft 625 of the gearbox using a PTFE lubricated bearing 639. Axially it is fixed between the engine shaft bearing 616 and another PTFE lubricated ring 640 which transfers the pressing force to the input shaft 625 of the gear box through a vibration damping device 627. PTFE bearings are assumed to be sufficient since the relative rotation is limited to a few degrees. The surface material of the ring 640 should be selected to obtain a suitable damping of possible oscillations between the rotor 620 of the electric motor and the input shaft of the gear box. The pressing force is provided by a disc or cup spring 638 which forces the bearing 616 in the engine shaft 601 to the right. During assembly, the outer ring part of bearing 616 is kept from falling out by the rotor 602.

The vibration damper has a first element 627 torsionally fixed to the gearbox input shaft using a spline. A second element 628 is fixed to the rotor 620 of the electric traction motor and springs 629 connecting the elements act as damping elements.

The electric traction motor shown can change its speed from a speed used for one gear to a speed suitable for the next gear in some 15 ms while still using moderate currents.

The input shaft 625 of the gearbox has several cogwheels, only the active ones of which are shown. The cogwheel 631 cooperates with the cogwheel 632 on the output shaft 633. A permanently used cogwheel 634 cooperates with the input cogwheel 635 of the differential.

A hybrid vehicle system has several forced air flows, such as the thermal engine input air, turbocharger input air, air for the cooling of cooling oil or water and air for cooling of battery cells. Therefore several flows of reasonable cool, filtered air are available. Some of this air can be entered into the electric motor enclosure and forced to cool the surface magnets of the rotor(s). Two airflow arrows illustrate this fact. They enter at the input opening 636, pass either through the airgap 639 or between the surface mounted magnets 638 of the electric traction motor, pass the traction motor winding head 640 and exit at 637 after having passed the outer side of the electric generator/motor rotor 602. In this way, the temperature of the magnets can be kept low. This permits the use of magnet material having a higher flux density and will also keep the flux from a given magnet material at a higher intensity as the temperature coefficient of currently used permanent magnet materials is negative.

If the stators 608 and/or 619 of the electric generator/motor and the electric traction motor respectively have their windings arranged as separate coils, each on wound around a stator pole as shown around the stator pole 605, the air flow could be directed to flow between the coils. If the rotor or rotors have surface mounted magnets with considerable space between the magnets, the air flow could be directed to flow between the magnets. For electric motors having both those features, the cooling air can flow between the coils, through the air gap and between the magnets, thus providing cooling of the surface of the coils as well as cooling of the magnets.

As is obvious for those skilled in the art, the embodiments shown in FIGS. 4a–f and 6 are not the only ones comprised within the general scope of the invention. The mechanical connection between an electric generator/motor 409 which in some settings permit the absorption of the thermal engine power when the thermal engine 403 lacks a direct mechanical torque transfer to the wheels can be made in many ways. Of these, only the most simple ones having shafts in common with other devices and with or without clutches are shown. Similarly, the connection of another electric traction motor 401 or several electric motors 424–427 to the wheels of the vehicle during the time periods when the thermal engine 403 lacks a direct mechanical torque transfer to the wheels can be made in many ways. They include the use of cog wheels, belts, chains, etc. The paths from the electric motor 401 and the thermal engine 403 to the differential gear 408 can be anything from fully shared, as in FIG. 4a, to completely separate, as in FIG. 4c. The electric traction motor can be anything from a single motor 401 to motors like 424–427 which are each one directly connected to one wheel. Many intermediate forms may be used. One such form could be to have one electric motor like 401 acting on the front wheel differential and another motor acting on a rear differential through a clutch. The clutch can be disengaged to eliminate the losses of this rear traction motor during normal driving and engaged during braking and conditions requiring four wheel drive. Yet another such form could be to have one electric motor like 401 acting on the front wheel differential and two hub motors acting directly on the two rear wheels.

Another such form is to use a mechanical four-wheel transmission in place of the two wheel transmissions shown in FIGS. 4a–d. This would permit the recovery of break energy in a system having only two electric motors.

Another general modification within the basic scope of the invention is to connect the electric generator/motor 409 and/or the electric traction motor(s) through clutches. This permits the system to let one or several of the motors to stay idle. This can be advantageous owing to the fact that the losses at high speed and no load can have some importance, especially for permanent magnet motors.

Whereas the preferred embodiment has a manual type gearbox with automated, non-manual shifts of gear position, the powertrain principle can be used with other gearbox principles:

1. A manual shift of gear position with gear shift suggestions from the system. In this embodiment, the system controller cannot execute a gearshift but can suggest a gearshift based on actual and anticipated load.
2. An automated gearshift with gear set suggestions from the driver. In this embodiment, the system controller executes all gearshifts but the driver can suggest a gearshift based on an anticipated load or speed change. The driver can also indicate that a gearshift which he anticipates that the system will make should be avoided, for example when accelerating up to a lower than normal queue speed.

Whereas the preferred embodiment has a manual type gearbox with automated clutch control, the powertrain principle can be used with other clutch control principles, such as:

3. A manual gearshift using a manual clutch control. As soon as the driver applies enough force on the clutch pedal, the system can disengage the clutch. As soon as the clutch is disengaged and the gear handle has been moved so much that the system can detect the gear position which the driver intends to use, the electric motor 401 can adjust the speed input to the gearbox to fit the new gear position. The system controller can delay the clutch engagement even if the driver has released the clutch pedal until the thermal engine speed has been adjusted to the new gear setting.
4. A manual gear shift using a manual clutch control obtained by operating a lever or pedal can be replaced or combined with sensors which detect the movement of the gearshift lever. As soon as the driver applies enough force on the handle, the system can disengage the clutch. As soon as the clutch is disengaged, the electric motor can adjust the input speed to the gearbox to fit the new gear, and the system controller can engage the clutch as soon as the thermal engine speed has been adjusted to the new clutch setting.

Whereas the preferred embodiment has a gearbox with one input shaft and one output shaft, the powertrain principle can be used with other shaft arrangements of the gearbox. In order to further decrease the delay from one gear position to the next gear position, a gearbox having several input shafts or several output shafts can be used. As an example, two output shafts can be used, each for example being connected to the input cogwheel of the differential gear through a clutch. As a gear box of a hybrid vehicle can operate without a reverse gear, the problems to find space for two output shafts should be easier than in a conventional gearbox. The total length could be reduced as each output shaft would carry only half the normal number of gears, even if the clutches would consume some of these gains. The cogwheels for the even gear positions can be located on one of the output shafts and the cogwheels for odd gear positions can be located on the other shaft. This permits the controller to synchronize the estimated forthcoming gear on the inactive shaft (with a non-engaged output clutch) while the other shaft transfers torque through the gearbox.

An actual gear shift operation, for example from gear position No. 2 to gear position No. 3, would then consist of a release of the thermal engine clutch, release of the even gear output shaft clutch, engagement of the odd gear output shaft clutch and change of the speed of the electric generator/motor. The actual timing of the three last operations will most likely depend on the release and engage times of the clutches, which normally is longer (some 100 ms when controlled by 24 V DC on-off control) than the time required to change the speed of the generator/motor. Using a more sophisticated control of the clutch coil voltage, the time from the ensured release of one clutch to the ensured engagement of the next one could be kept to some 30 ms, virtually eliminating the gap in providing torque to the tires.

Yet another alternative is to use a conventional automatic transmission in place of the gearbox.

All embodiments shown use a single thermal engine. In some applications more than one thermal engine may advantageously be used. One such application is the city bus. For city busses, it might be attractive to use gasoline engines as present diesels have considerable exhaust of small particles. The health consequences of these may be a problem. As most gasoline engines produced are too weak to cover all power needs of a bus, it might be advantageous to use two or more gasoline engines. This can either be implemented as two complete powertrains acting on the front and rear wheels respectively, or as one powertrain having for example two thermal engines 403 each having an electric generator/motor 409 and a clutch 407 acting on the same input shaft of a common gearbox. In most inter-city driving conditions, only one thermal engine would be used, while high speed or uphill operation could engage both engines.

Thermal Engine On/Off Control Strategies

If the internal combustion thermal engines of a hybrid system as the ones shown are to give a low total energy consumption, some criteria must be used for the controller to determine when the thermal engine is to be switched on and off. FIG. 5 and the simulation results of table 1 show the result of a fairly simple control strategy. The thermal engine is started if the speed of the tires is above a certain limit at the same time as the torque demanded for the tires is above a certain limit. The thermal engine is switched off when the torque demand on the tires goes below another limit. One or several of the three limit values can be changed as a function of the charge status of the battery. When the charge status of the battery is low, the parameters should be changed in a way that will cause the thermal engine to be switched on earlier and switched off later.

The control strategies can be arranged to accept input from the driver, as the driver knows his own plans, for example that a long steep slope will appear soon, or that he plans to accelerate to overtake a car.

The control strategies can also be arranged to accept input from a GPS system or other systems capable of determining the position of the vehicle. This information can be set in relation to a data base comprising data of a road system, for example presently available systems which use GPS data to show a map of the immediate vicinity of the vehicle. This information permits a much better possibility to estimate whether a change of torque demanded by the driver as given by the accelerator and brake pedals indicates temporary or longer time period requirements of power to be provided by the thermal engine. If the driver has keyed in his desired target, the control computer can use the information in the GPS system and the local map system to make an even better estimate of the immediate and long term power requirements and thus further optimize switch on and switch off times of the IC thermal engine. If the driver has not keyed in his desired target, the GPS system can be used to recognize common patterns like when the driver seems to be on a frequent route like home-to-work, and in other cases assume that the driver is going to follow the main routes.

Gear and Thermal Engine Torque Control Strategies

If the IC thermal engines of a hybrid system as the ones shown are to give a low total energy consumption, some criteria must be used for the controller to determine the gear which is to be used and the torque which should be demanded from the thermal engine.

The simulation model which has provided the data illustrated in FIG. 5 and in the simulation results of table 1 shows the result of a fairly simple control strategy. This partial strategy has as a given fact that the thermal engine is on or off and that the driver has requested a certain torque on the tires. This leaves two decisions for the local control strategy:
1. To keep or change the gear position.
2. The torque which is to be demanded from the thermal engine.

To reach a decision on these two variables, the controller calculates the total losses incurred for each gear position, and for each gear, the total losses (generator, battery, thermal engine etc.) incurred for a number of alternatives of the torque obtained from the thermal engine.

If the lowest losses should occur for any thermal engine torque for the present gear position or speed, the controller will keep the gear but change the torque to the optimal one if this is within the maximum torque change rate set by the limitations set by exhaust control system. Otherwise the torque is changed as far as possible in the desired direction.

If the lowest losses should occur for any thermal engine torque for another gear position than the present one, the controller will test if the potential long range improvement is large enough to motivate a change. Each change will cause some transient losses (a low efficient electric power transfer instead of a more efficient mechanical power transfer) and very frequent gear changes may irritate the passengers. In the simulation model generating FIG. 5, this is achieved by a constant minimum gain between the present and next gear. Better results will be obtained if some information on the expected future torque demand can be included when making the decision. Decisions on gear changes can be substantially improved using GPS data or by collecting a large amount of driving information to permit statistically better estimates on power demands for the near future.

Clutch or Movable Spline

The clutch must not have slip capacity. It can be replaced by other disconnectable torque transfer devices, for example by a sliding splined tube normally used to lock or release a cog wheel inside a gearbox. It can also be completely eliminated and its function replaced by using the neutral setting of the gearbox as an equivalent of a non-engaged clutch. This requires a sufficiently good synchronisation of the two shafts of the gearbox. If the clutch 407 of FIG. 4*b* or 4*c* is replaced by a solid shaft, the angular speed and phase of the two gearbox shafts can be controlled by the two electric motors 409 and 401, thus permitting gear engagement at very low speed differences (for example less than 20 rpm) or even at negligible speed differences.

Depending on the reliability level required and the reliability assumed for the electric components, i.e. motors, inverters, batteries, etc., the system may have anything from a normal clutch having a normal thermal capacity to a clutch having low thermal capacity which allows it to operate as a conventional clutch only for driving patterns adjusted to reduce the thermal load on the device to devices like splined tubes which can absorb only very small slips or speed differences between the two shafts to be connected by the clutch.

A clutch-free design will however in most cases require that the torsion vibration dampers found in normal vehicle clutch design are installed somewhere else in the powertrain. One solution to this is to arrange a similar, torsionally flexible connection between the thermal engine 403 and the electric generator/motor 409 or at the electric traction motor.

To further reduce losses in the powertrain, the normal immersion of cogs in oil can be replaced by spray or drop lubrication.

As the inner diameter of the active parts of the electric motors 409 and 401 can be rather large, it may be conceivable to place the clutch device inside the rotor of one of the electric motors 409 and 401 or even inside both rotors. The term "inside" here means that the clutch device is placed radially inside, as seen from the common axis of the clutch device and the respective rotor, the active parts of the respective rotor.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A powertrain of a vehicle having wheels, the powertrain comprising
   a mechanical gear box having five different gear ratios,
   at least one thermal engine having an output shaft, which shaft when required can be mechanically connected to at least one of the wheels through the mechanical gear box for driving the at least one of the wheels,
   an energy storage,
   at least one engine side electric motor and at least one tire side electric motor, which are connected to the energy storage and are supplied with electric power from the energy storage for supplying or receiving mechanical power or torque when required,
   connection means connected to the at least one engine side electric motor, to the at least one tire side electric motor, to the output shaft of the at least one thermal engine and to the at least one wheel for mechanically connecting the at least one engine side electric motor to the output shaft of the at least one thermal engine to be driven by the at least one thermal engine and for mechanically connecting the at least one tire side electric motor to the at least one of the wheels for driving the at least one of the wheels; and at least one device which when required performs the mechanical connection between the at least one thermal engine and the at least one wheel and is arranged in such a way that the mechanical connection is performed when a speed of an input shaft of the device is close to a speed of an output shaft of the device.

2. A powertrain according to claim 1, further comprising:

an input shaft coupled to the mechanical gear box wherein, the output shaft of the at least one thermal engine when required can be mechanically connected to the input shaft of the mechanical gear box for driving the at least one wheel through the mechanical gear box, and the connection means is arranged to mechanically connect, when the at least one thermal engine is not mechanically connected to the input shaft of the mechanical gear box, the at least one tire side electric motor to the input shaft of the mechanical gear box.

3. A powertrain according to claim 2, wherein the at least one tire side electric motor is mounted coaxially with the input shaft of the mechanical gear box and is connected to the input shaft of the mechanical gear box through a torsionally flexible coupling.

4. A powertrain according to claim 1, further comprising:

an input shaft and an output shaft coupled to the mechanical gear box wherein, the output shaft of the at least one thermal engine when required can be mechanically connected to the input shaft of the mechanical gear box for driving the at least one wheel through the mechanical gear box, and the connection means is arranged to mechanically connect, when the at least one thermal engine is not mechanically connected to the input shaft of the mechanical gear box, the at least one tire side electric motor to the output shaft of the mechanical gear box.

5. A powertrain according to any of claims 1–3, wherein the mechanical gear box has an output shaft, and at least one tire side electric motor is assembled on the output shaft of the mechanical gear box.

6. A powertrain according to any of claims 1–4, further comprising:

a differential connected between the mechanical gear box and the at least one wheel, the at least one tire side electric motor being assembled on a separate shaft and connected to the at least one wheels through a pinion acting against a cog wheel of the differential.

7. A powertrain according to claim 1, wherein the at least one engine side electric motor is coaxial with the output shaft of the at least one thermal engine.

8. A powertrain according to claim 7, wherein each engine side electric motor is rigidly connected to the output shaft of the at least one thermal engine.

9. A powertrain according to any of claims 7–8, wherein the at least one engine side electric motor has a stator including electrically/magnetically active parts and a rotor including magnetically active parts, the magnetically active parts of the rotor being located radially outside, as seen from an axis of the motor, the electrically/magnetically active parts of the stator.

10. A powertrain according to claim 1, further comprising at least one device which when required performs the mechanical connection between the at least one thermal engine and the at least one wheel and has a thermal capacity approximately equivalent to a conventional clutch.

11. A powertrain according to claim 1, further comprising at least one device which when required performs the mechanical connection between the at least one thermal engine and the at least one wheel and has a limited thermal capacity approximately equivalent to a conventional clutch only for driving patterns adjusted to reduce the thermal load on the device.

12. A powertrain according to claim 1, further comprising at least one device which when required performs the mechanical connection between the at least one thermal engine and the at least one wheel and accepts a predetermined amount of slip.

13. A powertrain according to claim 1, further comprising means which when required performs the mechanical connection the at least one thermal engine and the at least one wheel and which comprise shifting from a gear position of the mechanical gearbox to a neutral state of the gearbox.

14. A powertrain according to claim 1, further comprising the at least one engine side electric motor has a power rating which permits the at least one engine side electric motor to absorb all power of the at least one thermal engine during gear shift operations of the mechanical gearbox even if torque and speed of the at least one thermal engine during a gear shift operation should be kept between optimal levels for a previous gear position and optimal levels for a forthcoming gear position.

15. A powertrain according to claim 1, further comprising the a least one engine side electric motor has a power rating which permits the at least one engine side electric motor to absorb all power of the at least one thermal engine during gear shift operations which are prolonged to permit slow changes in a speed of the at least one thermal engine.

16. A powertrain according to claim 1, wherein the at least one engine side electric motor has a power rating which permits the at least one engine electric motor to continuously absorb all power of the at least one thermal engine for at least one speed and torque of the at least one thermal engine at which one speed and torque the at least one thermal engine can run at more than substantially 90% of a peak efficiency of the at least one thermal engine.

17. A powertrain according to claim 1, wherein the mechanical gear box has an output shaft, which is mechanically connected to a mechanical differential driving at least two wheels of the vehicle.

18. A powertrain according to claim 1, wherein the mechanical gear box has an output shaft, which is connected to at least two wheels of the vehicle through mechanical means.

19. A powertrain according to claim 1, wherein the mechanical gear box has an output shaft, which is mechanically connected to two mechanical differentials, each differential driving at least two wheels of the vehicle.

20. A powertrain according to claim 1, wherein the mechanical gear box has an output shaft, which is connected to at least four wheels of the vehicle through mechanical means.

21. A powertrain according to claim 1, further comprising two tire side electric motors, each tire side electric motor being connected to at least one wheel of the vehicle.

22. A powertrain according to claim 1, further comprising two tire side electric motors, each tire side electric motor being connected to at least two wheels of the vehicle through a mechanical differential.

23. A powertrain according to claim 1, further comprising at least four tire side electric motors, each tire side electric motor being connected to at least one wheel.

24. A powertrain according to claim 1, further comprising at least two tire side electric motors, one tire side electric motor being mechanically connected to the output shaft of the mechanical gearbox and at least one tire side electric motor being connected to at least one wheel of the vehicle and being mechanically disconnected from the gearbox.

25. A powertrain according to claim 1, further comprising a device for disconnecting the at least one engine side electric motor from the output shaft of the at least one thermal engine.

26. A powertrain according to claim 25, further comprising a device for connecting the at least one engine side electric motor to an input shaft of the mechanical gearbox while the at least one engine side electric motor is disconnected from the output shaft of the at least one thermal engine.

27. A powertrain according to claim 1, further comprising a device or devices for disconnecting the at least one tire side electric motor from the wheels.

28. A powertrain according to claim 7, wherein a clutch is assembled on a rotor of the at least one engine side electric motor, in particular is assembled on the rotor in a manner similar to the manner in which clutches are assembled on flywheels of thermal engines.

29. A powertrain according to claim 1, wherein the mechanical gearbox has one input shaft and one output shaft.

30. A powertrain according to claim 1, wherein the mechanical gearbox has at least two input shafts and means to mechanically connect any one of the at least two input shafts to the at least one thermal engine and/or to the at least one engine side electric motor.

31. A powertrain according to claim 1, wherein the mechanical gearbox has at least two output shafts and means to mechanically connect any one of the at least two output shafts to at least one wheel of the vehicle.

32. A powertrain according to any claims 30–31, wherein the mechanical gearbox has two input shafts or two output shafts, cog wheels of the mechanical gearbox for even gear positions being located on a first one of the two shafts and cog wheels of the mechanical gearbox for odd gear positions being located on a second, different one of the two shafts, thus permitting an inactive shaft to synchronise a forthcoming gear position while another shaft transfers torque through the mechanical gearbox.

33. A powertrain according to claim 1, wherein the mechanical gearbox has means for manually shifting gear positions.

34. A powertrain according to claim 1, wherein the mechanical gearbox has means for manually shifting gear positions and means for performing automated gear shifts.

35. A powertrain according to claim 1, wherein the mechanical gearbox comprises an automatic transmission.

36. A powertrain according to claim 1, wherein the mechanical gearbox comprises means for manually shifting gear positing and means for indicate to a driver of the vehicle when a shift of gear position are likely to permit reduced losses.

37. A powertrain of a vehicle having wheels, the powertrain comprising
a mechanical gear box having an input shaft and an output shaft,
a mechanical differential having an input gear,
an electric energy supply,
an electric motor, which has a rotor, is mechanically connected to the input shaft of the gear box and is electrically connected to the energy supply and supplied with electric power from the energy supply for supplying or receiving mechanical power or torque when required,
the powertrain further comprising means connected directly or indirectly to at least two devices selected among:
the rotor of the electric motor,
the input shaft of the gear box,
the output shaft of the gear box,
the input gear of the differential,
for measuring the speed and/or the position of the devices to which the means are connected; and
means for adjusting a speed of the electric motor during an operation for shifting a gear position of the mechanical gearbox so that a speed of the input shaft of the mechanical gearbox is rapidly adjusted to a speed suitable for an engagement of forthcoming gear position of the mechanical gearbox.

38. A powertrain according to claim 37, further comprising means for adjusting during an operation for shifting a gear position of the mechanical gearbox a speed and position of the electric motor so that a speed and position of the input shaft of the mechanical gearbox relative to the output shaft of the mechanical gearbox is rapidly adjusted to values suitable for an engagement of a forthcoming gear position of the mechanical gearbox.

39. A powertrain according to any of claims 37 and 38, wherein the electric motor is mounted coaxially with the input shaft of the mechanical gear box and is connected to the input shaft of the mechanical gear box through a torsionally flexible coupling.

40. A powertrain according to claim 37, further comprising a device connected to the output shaft of the mechanical gearbox for creating a torque on the output shaft of the mechanical gearbox.

41. A powertrain according to claim 40, wherein the device connected to the output shaft of the mechanical gearbox is arranged to create a torque in both directions on the shaft.

42. A powertrain of a vehicle having wheels, the powertrain comprising
a thermal engine having an output shaft, which when required can be mechanically connected to at least one of the wheels for carrying torque to and thereby driving the at least one of the wheels,
an energy storage,
an electric motor, which is mechanically connected to the thermal engine or to the at least one wheel and which is electrically connected to the energy storage and is supplied with electric power from the energy storage for supplying or receiving mechanical power or torque when required,
the powertrain further comprising torque measuring means connected to any of mechanical components carrying torque from the thermal engine to the at least one wheel,
wherein the torque measuring means is arranged to utilise torsional deflection of torsionally elastic elements in a mechanical path from the thermal engine to the at least one wheel;
further comprising means for estimating torque from the engine using values provided by the torque measuring means.

43. A powertrain according to claim 42 wherein said means for estimating torque also uses available information of torque of the electric motor.

44. A powertrain according to claim 42, wherein the torsionally elastic elements are arranged to provide a damping of ripple in torque from the thermal engine.

45. A powertrain according to claim 42, wherein the torsionally elastic elements are arranged to provide a considerable reduction of loads on synchronising components of the mechanical gearbox.

46. A method for selecting, in a powertrain of a vehicle having wheels, the powertrain comprising
a mechanical gear box,
at least one thermal engine having an output shaft, which when required can be mechanically connected to at least one of the wheels through the mechanical gear box for driving the at least one of the wheels,
an energy storage,
at least one electric motor, which is connected to the energy storage and is supplied with electric power from the energy storage for supplying or receiving mechanical power or torque when required,
a gear position of the mechanical gearbox to be used, the method further comprising:
using desired values of torque to be provided by the at least one thermal engine and by the at least one electric motor, and
determining the desired values by the steps of:
selecting a set of operational points for each gear position, each point representing a set of desired values for the torque provided by the at least one thermal engine and the at least one electric motor, which set fulfils a total requirement of power to be provided to the at least one wheel as given by a driver of the vehicle,
noting those points which are within limitations of rate of change of a speed and torque of the thermal engine as set by exhaust pollution limitation criteria,
calculating losses in all components of powertrain,
selecting for a gear position which is currently in use, an operational point which gives lowest total losses,
selecting among all other gear positions that gear position the operational point of which gives lowest total losses,
calculating whether the improvement which can be obtained by a change of gear position is large enough to accept losses and inconvenience incurred due to change of gear position,
setting a next set of desired values for the gear positions and torque to be provided by the at least one thermal engine and the at least one electric motor in such a way that an optimum loss operational point can be reached after some time and in such a way that limitations of rate of change of the speed and torque of the at least one thermal engine as set by exhaust pollution limitation criteria are respected.

47. A method for selecting, in a powertrain of a vehicle having wheels, the powertrain comprising
a mechanical gear box,
at least one thermal engine having an output shaft, which when required can be mechanically connected to at least one of the wheels through the mechanical gear box for driving the at least one of the wheels,
an energy storage,
at least one engine side electric motor and at least one tire side electric motor, which are connected to the energy storage and supplied with electric power from the energy storage for supplying or receiving mechanical power or torque when required, a gear position of the mechanical gearbox to be used, the method further comprising:
using desired values of torque to be provided by the at least one thermal engine, by the at least one engine side electric motor and the at least one tire side electric motor, and
determining the desired values by the steps of:
selecting a set of operational points for each gear position, each point representing a set of desired values for the torque provided by the at least one thermal engine, the at least one engine side electric motor and the at least one tire side electric motor, which set fulfils a total requirement of power to be provided to the at least one wheel as given by the driver,
noting those points which are within limitations of rate of change of a speed and torque of the thermal engine as set by exhaust pollution limitation criteria,
calculating losses in all components of powertrain,
selecting for a gear position which is currently in use, an operational point which gives lowest total losses,
selecting among all other gear positions that gear position the operational point of which gives lowest total losses,
calculating if the improvement which can be obtained by a change of gear position is large enough to accept losses and inconvenience incurred due to change of gear position,
setting a next set of desired values for the gear positions and torque to be provided by the thermal engines, engine side electric motors and tire side electric motors in such a way that an optimum loss operational point can be reached after some time and in such a way that limitations of rate of change of the speed and torque of the at least one thermal engine as set by exhaust pollution limitation criteria are respected.

48. A method for controlling the decision to start or stop a thermal engine of a powertrain of a vehicle having wheels, the powertrain comprising
at least one thermal engine having an output shaft, which when required can be mechanically connected to at least one of the wheels driving the at least one of the wheels,
an energy storage,
at least electric motor, which is mechanically connected to the engine or the at least one wheel and which is electrically connected to the energy storage and supplied with electric power from the energy storage for supplying or receiving mechanical power or torque when required,
the method comprising:
having the engine started if the speed of the at least one of the wheels is above a first limit at the same time as the torque demanded for the at least one of the wheels is above a second limit,
having the engine switched off when the torque demand on the at least one of the wheels goes below a third limit, the three limit values being changed as a function of the charge status of the energy storage, so that, when the charge status of the energy storage is low, the limit values are changed in a way which will cause the engine to be switched on earlier and switched off later, and when the charge status of the energy storage is high, the limit values are changed in a way which will cause the engine to be switched on later and switched off earlier.

49. A method according to claim 48, wherein in controlling the thermal engine signals are used which are derived from
   indicating means by which a driver can indicate that a power burst that would cause a start of the engine is estimated by the driver to be of short duration, thus recommending a control system not to start the engine, and
   estimating means by which the driver can indicate that the driver estimates that a considerable power burst will be required very soon, thus recommending the control system to start the engine.

50. A method for controlling the decision to start or stop the thermal engine in a powertrain of a vehicle having wheels, the powertrain comprising
   at least one thermal engine having an output shaft, which when required can be mechanically connected to at least one of the wheels driving the at least one of the wheels,
   an energy storage,
   at least electric motor, which is mechanically connected to the engine or the at least one wheel and which is electrically connected to the energy storage and supplied with electric power from the energy storage for providing or receiving mechanical power or torque when required,
   means to determine the position of the vehicle in relation to a data base over a road system,
   the method comprising:
      having the engine started if the torque demanded by the driver and the position of the vehicle in the road system indicates that the immediate and long term power requirement motivates a start of the engine,
      having the engine stopped if the torque demanded by the driver and the position of the vehicle in the road system indicates that the immediate and long term power requirement motivates a stop of the engine,
      a criteria used being changed as a function of the charge status of the energy storage, so that, when the charge status of the energy storage is low, the criteria being changed in a way which will cause the engine to be switched on earlier and switched off later, and when the charge status of the battery is high, the criteria being changed in a way which will cause the engine to be switched on later and switched off earlier.

51. A method according to any claims 48–50, further comprising recognising frequent driving patterns like when the driver seems to be on a frequent route like home-to-work and using the recognising in the controlling.

52. A method according to claim 50, wherein the means to determine the position of the vehicle is a Global Position System device.

53. A powertrain of a vehicle having wheels, the powertrain comprising
   at least one thermal engine having an output shaft,
   an energy storage,
   at least one engine side electric motor connected to the energy storage and supplied with electric power from the energy storage for supplying or receiving mechanical power or torque when required,
   mechanical means for transferring torque from the engine side electric motor to the output shaft of the thermal engine,
   a mechanical gear box having an input shaft and an output shaft and at least three different gear ratios,
   means for transferring torque from the output shaft of the gear box to at least one of the wheels,
   at least one tire side electric motor connected to the energy storage and supplied with electric power from the energy storage for supplying or receiving mechanical power or torque when required,
   mechanical means for transferring torque from the tire side electric motor to the input shaft of the gear box, and
   connection means connected to at least one selected among the at least one engine side electric motor and the output shaft of the at least one thermal engine and connected to at least one selected among the at least one tire side electric motor and the input shaft of the gear box for mechanically connecting the at least one thermal engine to the input shaft of the gear box.

54. The powertrain of claim 53, wherein the at least one tire side electric motor is rigidly connected to the input shaft of the gear box.

55. The powertrain of claim 53, wherein the mechanical gearbox comprises a manual type gearbox having automated, non-manual shifts of gear position.

56. The powertrain of claim 53, further comprising a torsionally flexible coupling, the at least one tire side electric motor mounted coaxially with the input shaft of the mechanical gear box and connected to the input shaft of the mechanical gear box through the torsionally flexible coupling, the torsionally flexible coupling connected in such a way that torque from the thermal engine must pass the torsionally flexible coupling when the thermal engine is mechanically connected to the at least one tire side motor.

57. The powertrain of claim 53, wherein the at least one tire side electric motor is assembled on the output shaft of the mechanical gear box.

58. The powertrain of claim 53, wherein the at least one engine side electric motor is coaxial with the output shaft of the at least one thermal engine.

59. The powertrain of claim 53, wherein the at least one engine side electric motor is arranged to supply or receive mechanical power or torque by being rigidly or directly coupled to the output shaft of the thermal engine.

60. The powertrain of claim 53 wherein the at least one engine side electric motor has a stator including electrically/magnetically active parts and a rotor including magnetically active parts, the magnetically active parts of the rotor being located radially outside, as seen from an axis of the motor, the electrically/magnetically active parts of the stator.

61. The powertrain of claim 53, further comprising at least one device which when required performs the mechanical connection between the at least one thermal engine and the at least one wheel and has a thermal capacity permitting the at least one device to operate as a clutch including a friction disc and a pressure plate.

62. The powertrain of claim 53, further comprising at least one device which when required performs the mechanical connection between the at least one thermal engine and the at least one wheel and has a limited thermal capacity permitting it to operate as a clutch including a friction disc and a pressure plate only for driving patterns adjusted to reduce the thermal load on the device.

63. The powertrain of claim 53, further comprising at least one device which when required performs the mechanical connection between the at least one thermal engine and the at least one wheel and is arranged in such a way that it can only perform the mechanical connection when a speed of an input shaft of the at least one device is close to a speed of an output shaft of the at least one device.

64. The powertrain of claim 53, further comprising at least one device which when required performs the mechanical connection between the at least one thermal engine and the at least one wheel and is adapted to only accept limited slip.

65. The powertrain of claim 53, wherein the at least one engine side electric motor has a power rating permitting the at least one engine side electric motor to absorb all power of the at least one thermal engine during gear shift operations of the mechanical gearbox even if torque and speed of the at least one thermal engine during a gear shift operation should be kept between optimal levels for a previous gear position and optimal levels for a forthcoming gear position.

66. The powertrain of claim 53, wherein the a least one engine side electric motor has a power rating permitting the at least one engine side electric motor to absorb all power of the at least one thermal engine during gear shift operations which are prolonged to permit slow changes in a speed of the at least one thermal engine.

67. The powertrain of claim 53, wherein the at least one engine side electric motor has a power rating permitting the at least one engine electric motor to continuously absorb all power of the at least one thermal engine for at least one speed and torque of the at least one thermal engine at which one speed and torque the at least one thermal engine can run at more than substantially 90% of a peak efficiency of the at least one thermal engine.

68. The powertrain of claim 53, further comprising a mechanical differential driving at least two of the wheels of the vehicle and mechanically connected to the output shaft of the mechanical gear box.

69. The powertrain of claim 53, further comprising mechanical means connecting the output shaft of the mechanical gear box to at least two of the wheels of the vehicle.

70. The powertrain of claim 53, further comprising two mechanical differentials, each of the two mechanical differentials driving at least two wheels of the vehicle and the output shaft of the mechanical gear box mechanically connected to each of the two mechanical differentials.

71. The powertrain of claim 53 further comprising mechanical means connecting the output shaft of the mechanical gear box to at least four of the wheels of the vehicle.

72. The powertrain of claim 53 comprising two tire side electric motors, each of the two tire side electric motors connected to at least one of the wheels of the vehicle.

73. The powertrain of claim 53 comprising two tire side electric motors and two mechanical differentials, each of the two tire side electric motors connected to at least two wheels of the vehicle through a respective one of the two mechanical differentials.

74. The powertrain of claim 53 comprising at least four tire side electric motors, each of the at least four tire side electric motors connected to at least one of the wheels of the vehicle.

75. The powertrain of claim 53 comprising at least two tire side electric motors, one of the two tire side electric motors mechanically connected to the output shaft of the mechanical gearbox and at least one of the two tire side electric motor connected to at least one of the wheels of the vehicle and mechanically disconnected from the gearbox.

76. The powertrain of claim 53, further comprising a device for disconnecting the at least one engine side electric motor from the output shaft of the at least one thermal engine.

77. The powertrain of claim 73, further comprising a device for connecting the at least one engine side electric motor to the input shaft of the mechanical gearbox while the at least one engine side electric motor is disconnected from the output shaft of the at least one thermal engine.

78. The powertrain of claim 53, further comprising at least one device for disconnecting the at least one tire side electric motor from the wheels of the vehicle.

79. The powertrain of claim 53, further comprising a clutch assembled on a rotor of the at least one engine side electric motor.

80. The powertrain of claim 79, wherein the clutch is assembled on the rotor in a manner similar to a manner in which clutches are assembled on flywheels of thermal engines.

81. The powertrain of claim 53, wherein the mechanical gearbox has a single input shaft and a single output shaft.

82. The powertrain of claim 53, wherein the mechanical gearbox comprises at least two input shafts and means to mechanically connect any one of the at least two input shafts to the at least one thermal engine and/or to the at least one engine side electric motor.

83. The powertrain of claim 53, wherein the mechanical gearbox comprises at least two output shafts and means to mechanically connect any one of the at least two output shafts to at least one of the wheels of the vehicle.

84. The powertrain of claim 53, wherein the mechanical gearbox comprises two input shafts or two output shafts, cog wheels of the mechanical gearbox for even gear positions being located on a first one of the two input or output shafts respectively and cog wheels of the mechanical gearbox for odd gear positions being located on a second, different one of the two input or output shafts, thereby permitting an inactive one of the two input or output shafts to synchronise a forthcoming gear position while another of the two input or output shafts transfers torque through the mechanical gearbox.

85. The powertrain of claim 53, wherein the mechanical gearbox comprises means for manually shifting gear positions.

86. The powertrain of claim 53, wherein the mechanical gearbox comprises means for manually shifting gear positions and means for performing automated gear shifts.

87. The powertrain of claim 53, wherein the mechanical gearbox comprises an automatic transmission.

88. The powertrain of claim 53, wherein the mechanical gearbox comprises means for manually shifting gear positions and means for indicating to a driver of the vehicle when a shift of gear position is likely to permit reduced losses.

89. The powertrain of claim 53, further comprising a first mechanical clutch connected in the output shaft of the thermal engine between a first portion of said output shaft close to the thermal engine and a second portion of said output shaft distant from the thermal engine, the at least one tire side electric motor mechanically connected to the second portion.

90. The powertrain of claim 89, wherein the at least one thermal engine side electric motor comprises a combined electric generator and motor mechanically connected to the first portion to be driven thereby and to drive the first portion, the combined electric motor and generator electrically connected to the energy storage to charge the energy storage and to be supplied with electric power thereby, when required.

91. The powertrain of claim 53, further comprising a differential gear, the output shaft of the mechanical gearbox having a cog wheel cooperating with a cog wheel on an input shaft of the differential gear, an output shaft of the least one tire side electric motor having a toothed wheel also co-operating with the toothed wheel of the input shaft of the differential gear.

92. The powertrain of claim 89, further comprising a second mechanical clutch connected in the output shaft of the thermal engine between the thermal engine and the combined electric generator and motor.

93. The powertrain of claim 53, further comprising measuring means connected directly or indirectly to at least two devices selected among:

the rotor of the electric motor, the input shaft of the gear box, the output shaft of the gear box, the input gear of the differential, for measuring the speed and/or the position of the devices to which the measuring means are connected.

94. The powertrain of claim 53, further comprising a torsionally flexible coupling, at least one of the at least one engine side electric motor and the at least one tire side electric motor being mounted coaxially with the input shaft of the mechanical gear box and connected to the input shaft of the mechanical gear box through the torsionally flexible coupling.

95. The powertrain of claim 53, further comprising a device connected to the output shaft of the mechanical gearbox for creating a torque on the output shaft of the mechanical gearbox, the created torque being relatively small and insignificant for propelling the vehicle.

96. The powertrain of claim 95, wherein the device connected to the output shaft of the mechanical gearbox is arranged to create a torque in both directions on the output shaft of the mechanical gearbox.

97. The powertrain of claim 53, further comprising torque measuring means connected to any of mechanical components carrying torque from the at least one thermal engine to at least one of the wheels of the vehicle.

98. The powertrain of claim 97, further comprising means for estimating torque from the at least one thermal engine using values provided by the torque measuring means.

99. The powertrain of claim 97, further comprising means for estimating torque from the thermal engine using values provided by the torque measuring means and using available information of torque of at least one of the at least one engine side electric motor and the at least one tire side electric motor.

100. The powertrain of claim 53, wherein at least part of filtered air from an air filter of the thermal engine is made to pass in such away that at least part of at least one of the at least one engine side electric motor and the at least one tire side electric motor obtains cooling from the filtered air.

101. The powertrain of claim 100, wherein at least part of the filtered air is made to pass through an airgap of said at least one of the at least one engine side electric motor and the at least one tire side electric motor.

102. The powertrain of claim 100, wherein at least part of the filtered air is made to pass along permanent magnets of said at least one of the at least one engine side electric motor and the at least one tire side electric motor.

103. The powertrain of claim 100, wherein at least part of the air is made to pass between windings of said at least one of the at least one engine side electric motor and the at least one tire side electric motor.

104. A powertrain of a vehicle having wheels, the powertrain comprising:

at least one thermal engine having an output shaft, an energy storage, at least one engine side electric motor connected to the energy storage and supplied with electric power from the energy storage for supplying or receiving mechanical power or torque when required, mechanical means for transferring torque from the engine side electric motor to the output shaft of the thermal engine, a mechanical gear box having an input shaft and an output shaft, means for transferring torque from the output shaft of the gear box to at least one of the wheels, at least one tire side electric motor connected to the energy storage and supplied with electric power from the energy storage for supplying or receiving mechanical power or torque when required, mechanical means for transferring torque from the tire side electric motor to the input shaft of the gear box, connection means connected to at least one selected among the at least one engine side electric motor and the output shaft of the at least one thermal engine and connected to at least one selected among the at least one tire side electric motor and the input shaft of the gear box for mechanically connecting the at least one thermal engine to the input shaft of the gear box; and means for adjusting a speed of the electric motor during an operation for shifting a gear position of the mechanical gearbox so that a speed of the input shaft of the mechanical gearbox is rapidly adjusted to a speed suitable for a fast engagement of a forthcoming gear position of the mechanical gearbox.

105. A powertrain of a vehicle having wheels, the powertrain comprising:

at least one thermal engine having an output shaft, an energy storage, at least one engine side electric motor connected to the energy storage and supplied with electric power from the energy storage for supplying or receiving mechanical power or torque when required, mechanical means for transferring torque from the engine side electric motor to the output shaft of the thermal engine, a mechanical gear box having an input shaft and an output shaft, means for transferring torque from the output shaft of the gear box to at least one of the wheels, at least one tire side electric motor connected to the energy storage and supplied with electric power from the energy storage for supplying or receiving mechanical power or torque when required, mechanical means for transferring torque from the tire side electric motor to the input shaft of the gear box, connection means connected to at least one selected among the at least one engine side electric motor and the output shaft of the at least one thermal engine and connected to at least one selected among the at least one tire side electric motor and the input shaft of the gear box for mechanically connecting the at least one thermal engine to the input shaft of the gear box; and means for adjusting during an operation for shifting a gear position of the mechanical gearbox a speed and position of the electric motor so that a speed and position of the input shaft of the mechanical gearbox relative to the output shaft of the mechanical gearbox is rapidly adjusted to values suitable for a fast engagement of a forthcoming gear position of the mechanical gearbox.

106. A powertrain of a vehicle having wheels, the powertrain comprising:

at least one thermal engine having an output shaft, an energy storage, at least one engine side electric motor connected to the energy storage and supplied with electric power from the energy storage for supplying or receiving mechanical power or torque when required, mechanical means for transferring torque from the engine side electric motor to the output shaft of the thermal engine, a mechanical gear box having an input shaft and an output shaft, means for transferring torque from the output shaft of the gear box to at least one of the wheels, at least one tire side electric motor connected to the energy storage and supplied with electric power from the energy storage for supplying or receiving mechanical power or torque when required, mechanical means for transferring torque from the tire side electric motor to the input shaft of the gear box, connection means connected to at least one selected among the at least one engine side electric motor and the output shaft of the at least one thermal engine and connected to at least one selected among the at least one tire side electric motor and the input shaft of the gear box for mechanically connecting the at least one thermal engine to the input shaft of the gear box; and torque measuring means connected to any of mechanical components carrying torque from the at least one thermal engine to at least one of the wheels of the vehicle, wherein the torque measurement means are arranged to utilise torsional deflection of at least one torsionally elastic element in a mechanical path from the at least one thermal engine to the at least one of the wheels of the vehicle.

107. The powertrain of claim 106, wherein the at least one torsionally elastic element is arranged to provide a damping of ripple in torque from the at least one thermal engine.

108. The powertrain of claim 106, further comprising at least one torsionally elastic element arranged to provide a considerable reduction of loads on synchronising components of the mechanical gearbox.

109. A method for selecting, in a powertrain of a vehicle having wheels, the powertrain comprising:

a mechanical gear box, at least one thermal engine having an output shaft, which when required can be mechanically connected to at least one of the wheels through the mechanical gear box for driving said at least one of the wheels, an energy storage, at least one electric motor connected to the energy storage and supplied with electric power from the energy storage for supplying or receiving mechanical power or torque when required, the method including the steps of:

using desired values of torque to be provided by the at least one thermal engine and by the at least one electric motor, and determining the desired values by the steps of:

selecting a set of operational points for each gear position, each point representing a set of desired values for the torque provided by the at least one thermal engine and the at least one electric motor, which set fulfils a total requirement of power to be provided to the at least one wheel as given by a driver of the vehicle, noting those points which are within limitations of rate of change of a speed and torque of the thermal engine as set by exhaust pollution limitation criteria, calculating losses in all components of the powertrain for those operational points, selecting for a gear position which is currently in use, an operational point which gives lowest total losses, selecting among all other gear positions that gear position the operational point of which gives lowest total losses, calculating whether an improvement which can be obtained by a change of gear position is large enough to accept losses and inconvenience incurred due to change of gear position, setting a next set of desired values for the gear positions and torque to be provided by the at least one thermal engine and the at least one electric motor in such a way that an optimum loss operational point can be reached after some time and in such a way that limitations of rate of change of the speed and torque of the at least one thermal engine as set by exhaust pollution limitation criteria are respected.

110. The method of claim 109, wherein in the step of calculating, losses are calculated for thermal engines, engine side electric motors, tire side electric motors, electric power inverters and energy storage if any.

111. A method for selecting, in a powertrain of a vehicle having wheels, the powertrain comprising:

a mechanical gear box, at least one thermal engine having an output shaft, which when required can be mechanically connected to at least one of the wheels through the mechanical gear box for driving said at least one of the wheels, an energy storage, at least one engine side electric motor and at least one tire side electric motor, which are connected to the energy storage and supplied with electric power from the energy storage for supplying or receiving mechanical power or torque when required, a gear position of the mechanical gearbox to be used, the method including the steps of:

using desired values of torque to be provided by the at least one thermal engine, by the at least one engine side electric motor and the at least one tire side electric motor, and determining the desired values by the steps of:

selecting a set of operational points for each gear position, each point representing a set of desired values for the torque provided by the at least one thermal engine, the at least one engine side electric motor and the at least one tire side electric motor, which set fulfils a total requirement of power to be provided to the at least one wheel as given by the driver, noting those points which are within limitations of rate of change of a speed and torque of the at least one thermal engine as set by exhaust pollution limitation criteria, calculating losses in all components of powertrain for those operational points, selecting for a gear position which is currently in use, an operational point which gives lowest total losses, selecting among all other gear positions that gear position the operational point of which gives lowest total losses, calculating if the improvement which can be obtained by a change of gear position is large enough to accept losses and inconvenience incurred due to change of gear position, setting a next set of desired values for the gear positions and torque to be provided by the at least one thermal engine, the at least one engine side electric motor and the at least one tire side electric motor in such a way that an optimum loss operational point can be reached after some time and in such a way that limitations of rate of change of the speed and torque of the at least one thermal engine as set by exhaust pollution limitation criteria are respected.

112. The method of claim 111, wherein in the step of calculating, losses are calculated for thermal engines, engine side electric motors, tire side electric motors, electric power inverters and energy storage if any.

113. A method for controlling the decision to start or stop a thermal engine of a powertrain of a vehicle having wheels carrying tires, the powertrain comprising:

at least one thermal engine having an output shaft, which when required can be mechanically connected to at least one of the wheels for driving said at least one of the wheels, an energy storage, at least one electric motor, which is mechanically connected to the engine or said at least one wheel and which is electrically connected to the energy storage and supplied with electric power from the energy storage for supplying or receiving mechanical power or torque when required, the method including the steps of:

having the engine started if the speed of the tires is above a first limit at the same time as the torque demanded for the tires is above a second limit, having the engine switched off when the torque demand on the tires goes below a third limit the three limit values being changed as a function of the charge status of the energy storage, so that, when the charge status of the energy storage is low, the limit values are changed in a way which will cause the engine to be switched on earlier and switched off later, and when the charge status of the energy storage is high, the limit values are changed in a way which will cause the engine to be switched on later and switched off earlier.

114. The method of claim 113, wherein, in controlling the at lest one thermal engine, signals are used which are derived from first indicating means arranged to allow a driver of the vehicle to indicate, that a power burst that would cause a start of the at least one thermal engine, is estimated to be of short duration, thus recommending a control system not to start the at least one thermal engine, and second indicating means arranged to allow the driver to indicate, that a considerable power burst is estimated to be required very soon, thus recommending the control system to start the at least one thermal engine.

* * * * *